US007689718B2

(12) United States Patent
Carlson et al.

(10) Patent No.: US 7,689,718 B2
(45) Date of Patent: Mar. 30, 2010

(54) CHANNEL SUBSYSTEM SERVER TIME PROTOCOL COMMANDS AND SYSTEM THEREFOR

(75) Inventors: Scott M. Carlson, Tucson, AZ (US); Donald Crabtree, Port Ewen, NY (US); Dennis J. Dahlen, Rhinebeck, NY (US); Beth A. Glendening, Poughkeepsie, NY (US); Michel H. T. Hack, Cortlandt Manor, NY (US); Denise M. Sevigny, Wappingers Falls, NY (US); Ronald M. Smith, Sr., Wappingers Falls, NY (US); David E. Whitney, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 241 days.

(21) Appl. No.: 11/876,796

(22) Filed: Oct. 23, 2007

(65) Prior Publication Data

US 2008/0183898 A1   Jul. 31, 2008

Related U.S. Application Data

(60) Provisional application No. 60/887,544, filed on Jan. 31, 2007.

(51) Int. Cl.
  *G06F 15/16* (2006.01)
(52) U.S. Cl. .................. 709/246; 709/200; 709/228; 713/400; 713/500
(58) Field of Classification Search ............. 709/200, 709/228, 246; 713/400, 500
  See application file for complete search history.

(56) References Cited

U.S. PATENT DOCUMENTS 4,894,846 A   1/1990   Fine
5,481,258 A *   1/1996   Fawcett et al. ............. 340/7.26

(Continued)

FOREIGN PATENT DOCUMENTS

WO    01/95550 A2    12/2001

OTHER PUBLICATIONS

J. Burbank et al., "The Network Time Protocol Version 4 Protocol Specification; draft-ietf-ntp-ntpv4-proto-02.txt", IETF Standard-Working-Draft, Internet Engineering Task Force, IETF, CH, vol. ntp, No. 2, Mar. 2006, XP015045008, ISSN: 0000-0004.

(Continued)

*Primary Examiner*—Salad Abdullahi
*Assistant Examiner*—El Hadji M Sall
(74) *Attorney, Agent, or Firm*—John E. Campbell; Blanche E. Schiller, Esq.; Heslin Rothenberg Farley & Mesiti P.C.

(57) ABSTRACT

A protocol for communicating with the timing facility used in a data processing network to provide synchronization is provided via the execution of a machine instruction that accepts a plurality of commands. The interaction is provided through the use of message request blocks and their associated message response blocks. In this way timing parameters may be determined, modified and communicated. This makes it much easier for multiple servers or nodes in a data processing network to exist as a coordinated timing network and to thus more cooperatively operate on the larger yet identical data files.

28 Claims, 18 Drawing Sheets

U.S. PATENT DOCUMENTS

| | | | |
|---|---|---|---|
| 5,636,373 A * | 6/1997 | Glendening et al. | 713/400 |
| 5,848,028 A | 12/1998 | Burklin | |
| 5,925,107 A | 7/1999 | Bartfai et al. | |
| 6,173,023 B1 | 1/2001 | Tanonaka et al. | |
| 6,351,821 B1 * | 2/2002 | Voth | 713/600 |
| 6,591,370 B1 * | 7/2003 | Lovett et al. | 713/502 |
| 6,606,362 B1 | 8/2003 | Daizell et al. | |
| 6,636,987 B1 * | 10/2003 | Ruffini | 714/12 |
| 6,697,382 B1 * | 2/2004 | Eatherton | 370/503 |
| 6,714,563 B1 | 3/2004 | Kushi | |
| 6,742,044 B1 | 5/2004 | Aviani et al. | |
| 7,356,725 B2 | 4/2008 | Engler | |
| 7,395,448 B2 | 7/2008 | Smith | |
| 7,454,648 B2 | 11/2008 | Dahlen | |
| 7,475,272 B2 | 1/2009 | Carlson | |
| 2002/0073228 A1 | 6/2002 | Cognet | |
| 2002/0131370 A1 | 9/2002 | Chuah | |
| 2003/0035444 A1 | 2/2003 | Zwack | |
| 2003/0152177 A1 | 8/2003 | Cahill-O'Brien | |
| 2004/0125822 A1 | 7/2004 | Jun et al. | |
| 2005/0033862 A1 | 2/2005 | Blum | |
| 2007/0086489 A1 | 4/2007 | Carlson | |
| 2007/0086490 A1 | 4/2007 | Carlson | |
| 2008/0059655 A1 | 3/2008 | Carlson | |
| 2008/0059808 A1 | 3/2008 | Engler | |
| 2008/0072097 A1 | 3/2008 | Check | |
| 2008/0183849 A1 | 7/2008 | Carlson | |
| 2008/0183877 A1 | 7/2008 | Carlson | |
| 2008/0183895 A1 | 7/2008 | Carlson | |
| 2008/0183896 A1 | 7/2008 | Carlson | |
| 2008/0183897 A1 | 7/2008 | Carlson | |
| 2008/0183899 A1 | 7/2008 | Carlson | |
| 2008/0184060 A1 | 7/2008 | Carlson | |

OTHER PUBLICATIONS

D. L. Mills, "Internet Time Synchronization: The Network Time Protocol", IEEE Transactions on Communications, IEEE Service Center, Piscataway, NY, US, vol. 39, No. 10, Oct. 1, 1991, pp. 1482-1493, XP000275311, ISSN: 0090-6778.

L.S. Liang, "Time Server in Advanced Automation Local Area Network", Computer Standards and Interfaces, Elsevier Sequoia, Lausanne,CH, vol. 6, No. 3, Jan. 1989,pp. 223-227, XP000112504, ISSN: 0920-5489.

"z/Architecture Principles of Operation," IBM Publication No. SA22-7832-04, Sep. 2005.

Kadoch, Michel, "ATM Signalling: A Tutorial," Canadian Conference on Electrical and Computer Engineering - Congres Canadien En Genie Electrique Et Informatique, vol. 1, Sep. 5, 1995; pp. 420-423, XP000618815; p. 421-p. 422.

Office Action for U.S. Appl. No. 11/940,558 dated September 3, 2009.

PCT Notification of Transmittal of the International Search Report and the Written Opinion of the International Searching Authority, or the Declaration; International Application No. PCT/EP2008/050620.

PCT Notification of Transmittal of the International Search Report and the Written Opinion of the International Searching Authority, or the Declaration; International Application No. PCT/EP2008/050739.

PCT Notification of Transmittal of the International Search Report and the Written Opinion of the International Searching Authority, or the Declaration; International Application No. PCT/EP2008/050726.

PCT Notification of Transmittal of the International Search Report and the Written Opinion of the International Searching Authority, or the Declaration; International Application No. PCT/EP2008/050524.

PCT Notification of Transmittal of the International Search Report and the Written Opinion of the International Searching Authority, or the Declaration; International Application No. PCT/EP2008/050482.

* cited by examiner

|  "0020" | | | "0033" | |
|---|---|---|---|---|
| Reserved | FMT | Reserved | | |
| STP Op | | Reserved | STP Controls | |
| | | | Reserved | |

Figure 1

| Response Code | Reserved | | | |
|---|---|---|---|---|
| L2 | Reserved | FMT | Reserved | TOD Clock Change | Reserved |

Figure 2

| "0010" | | "0038" | |
|---|---|---|---|
| Reserved | FMT | Reserved | |
| Reserved | | | |
| Reserved | | | |

Figure 3

| Response Code | | Reserved | | | | | | |
|---|---|---|---|---|---|---|---|---|
| L2 | FMT | | Reserved | TST | Reserved | CTN ID | Reserved |
| | Reserved | | TMD | | | | |
| | | | Reserved | | | | |

Figure 6

| STP Link Identifier | DESC | I | 000 | URC |
|---|---|---|---|---|
| Stratum | Reserved | | | |
| ESP RC | | | | |
| Attached CTN ID | | | | |
| Reserved | | | | |
| Link Node Descriptor | | | | |
| Attached Node Descriptor | | | | |
| Reserved | | | | |

Figure 9

| Reserved | FMT | Reserved | Response Code |
|---|---|---|---|
| Token |||||
| Reserved |||||
| Node Information Block |||||
| Node Information Block |||||
| ...... |||||
| Node Information Blocks 3 through n |||||

| "0010" | | | "003E" |
|---|---|---|---|
| Reserved | FMT | Reserved | Reserved |

| L2 | FMT | Reserved | Data Timestamp | Reserved | Time Zone Control Parameters Information Block (TCPIB) | Leap Seconds Offset Information Block (LSOIB) |
|---|---|---|---|---|---|---|
| Response Code | | | | | | |
| | Reserved | | | | | |

Figure 14

CHANNEL SUBSYSTEM SERVER TIME PROTOCOL COMMANDS AND SYSTEM THEREFOR

Cross-Reference to Related Applications

This application claims priority to U.S. Provisional Application No. 60/887,544, entitled "CHANNEL SUBSYSTEM SERVER TIME PROTOCOL COMMANDS", filed Jan. 31, 2007, which is hereby incorporated herein by reference in its entirety.

TECHNICAL FIELD

The present invention relates in general to timing protocols used in data processing systems which include a plurality of servers, one or more of which may not be located in the same physical location or which may be located some distance apart at a single location. Even more particularly, the present invention is directed to a system, method and program product which provides a mechanism for communicating with a timing protocol facility in a data processing network.

BACKGROUND OF THE INVENTION

The present invention is not concerned with networks of data processing servers or nodes whose only function is the carrying out of asynchronous communications. Rather, the present invention is directed to multinode data processing networks which exhibit or require time synchronization. This synchronization is important when it comes to file sharing operations to insure that the order in which data is read from and written into files is consistent with the intentions of system users. To this end the assignee of the present invention has provided software and hardware facilities to accomplish these goals. In particular, one may employ a device identified as the IBM 9037 Sysplex Timer or ETR (External Time Reference). Because of the high speed of modern data processing systems, timing synchronization is typically set to be such that the differences in time lie at the submicrosecond level.

Against these demanding time considerations, it still happens that in the course of network operation it may become useful or desirable to change one or more aspect of the timing information that is exchanged in the network. The changes addressed here are one that are driven by external factors, such as the desire of the system operator to change time zones or the desire to change the timing to account for local variations and adoptions made for such things as "Daylight Savings Time." The communications that are used to match timing information in disparate systems should be reliable.

Use of a time reference such as the 9037 Sysplex Timer, provides this reliability; the data processing servers in the network thus have a dedicated direct connection for the sole purpose of forwarding timing information to that system. In this system, directly attached data processing components continually monitor each individual timing related information field to determine if it has been updated. This involves the use of processing power at each node in the network to detect changes in the timing parameters. The timing information typically includes an ETR network identifier, a leap seconds offset and a total time offset, which is the sum of the time zone and daylight savings time offsets. Scheduled updates are viewed at the ETR console and not at each individual system in the timing network. Lastly, if a node loses all communication with the ETR, the parameter data is considered to be invalid at that point in time.

It is thus seen that it is not only desirable to have the nodes in a data processing network synchronized to a desired degree of accuracy, but that it is also desirable to be able to have a new server join the network in a safe and secure fashion. The process of having a server leave a network is not as difficult, though it is still important to maintain synchronization while time dependent processes are running and interacting with one or more server nodes.

SUMMARY OF THE INVENTION

The shortcomings of the prior art are overcome and additional advantages are provided via a computer implemented method for communicating with a facility that provides timing coordination in a data processing system. The method comprising the steps of: placing request information within a first block of memory called the request block; executing a machine instruction which accesses the first block to retrieve a command and timing related parameters therefrom; and placing the results from the execution of the instruction in a second block of memory, called the response block.

More particularly, the present invention provides a machine instruction for time of day synchronization and for setting various parameters associated with the synchronization process. The present invention provides fetching and execution steps that employ command and response control blocks together with subordinate fields therein. These fields address issues such as whether or not the clock source is stable, whether or not the timing facility is enabled, whether or not certain system checks are enabled to produce interrupts. Even more particularly, the subordinate fields address the issue of how much the time of day setting is adjusted and the status associated with different link paths. One of the function that the machine instruction provides is the ability to communicate with the timing facility over multiple paths in a dynamic fashion.

Additional features and advantages are realized through the techniques of the present invention. Other embodiments and aspects of the invention are described in detail herein and are considered a part of the claimed invention.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

FIG. 1 is a block diagram illustrating a useful structure for the Command-Request Block for the Set STP (Server Time Protocol) Controls command;

FIG. 2 is a block diagram illustrating a useful structure for the Command-Response Block for the Set STP Controls command;

FIG. 3 is a block diagram illustrating a useful structure for the Command-Request Block for the Store STP Information command;

FIG. 6 is a block diagram illustrating a useful structure for the Command-Response Block for the Store STP Information Fast command;

FIG. 9 is a block diagram illustrating a useful structure for the STP-link-information block that is part of the Command-Response Block for the Store STP Link Information command seen in FIG. 8;

FIG. 11 is a block diagram illustrating a useful structure for the Command-Response Block for the Store STP Network Node Identifiers command;

FIG. 13 is a block diagram illustrating a useful structure for the Command-Request Block for the Store Time Zone Information command;

FIG. 14 is a block diagram illustrating a useful structure for the Command Response Block for the Store Time Zone Information command;

DETAILED DESCRIPTION

Figures 4A, 4B:
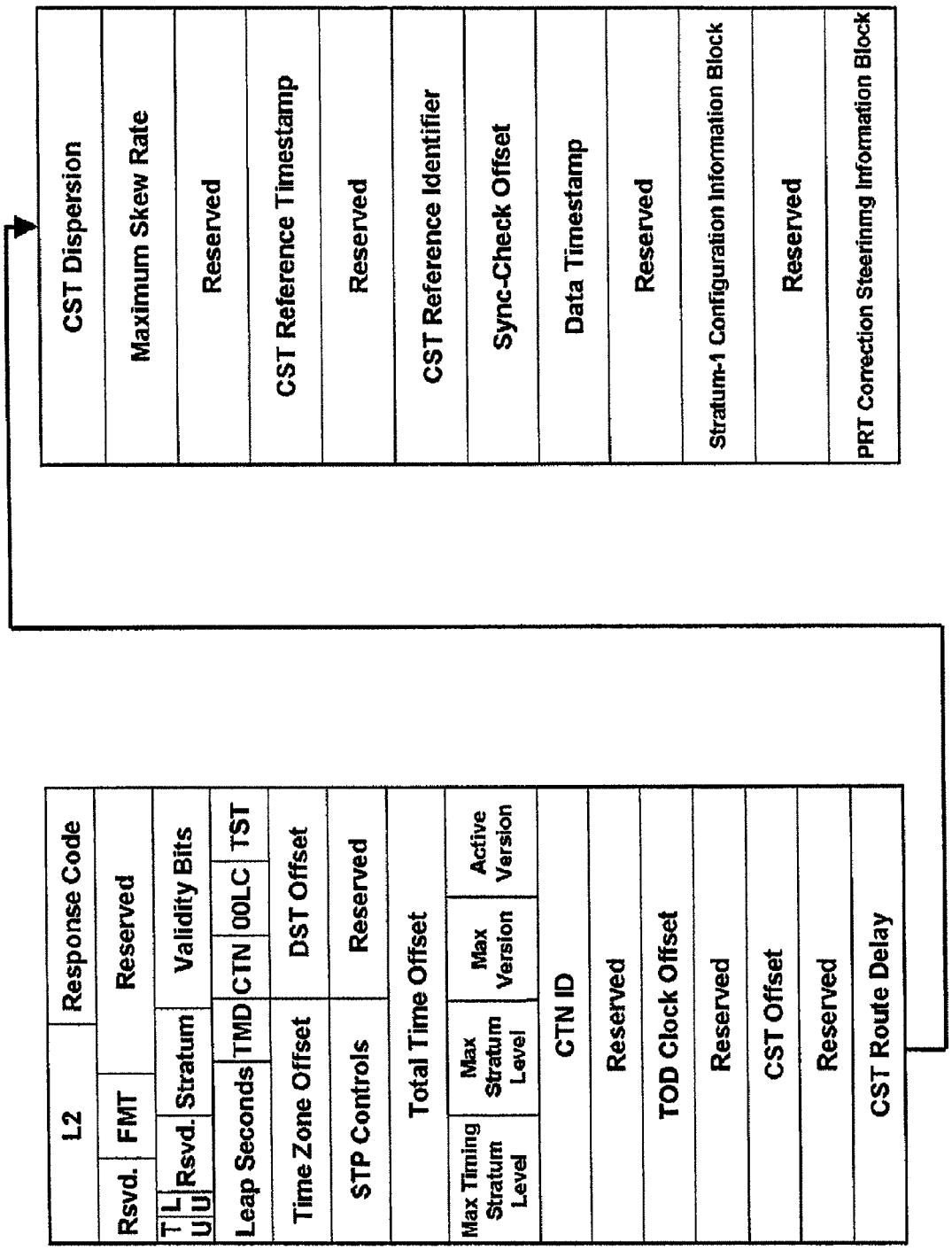
FIGS. 4A and 4B is a block diagram illustrating a useful structure for the Command-Response Block for the Store STP Information command.

The present application is directed to timing protocols used in data processing systems which employ a plurality of servers, one or more of which may not be located in the same physical location or are located some distance apart at a single location. In particular, the present invention involves the inclusion of six new STP commands which operate jointly and severally to improve system timing characteristics. These new commands or "orders" are the following:

Set STP Controls
Store STP Information
Store STP Information Fast
Store STP Link Information
Store STP Network Node Identifiers
Store Time Zone Information STP (Server Time Protocol) messages are transmitted over STP paths between two servers in the form of a message command and a message response. The new commands provided herein are thus described in terms of their effects as initiated via a message request block and as result in changes in their associated message response blocks. Accordingly, it is seen that much of the discussion below is divided in considerations concerning the structure of request and response blocks.

One of these commands is the Set STP Controls command and it is designated by the mnemonic "SSTPC." The Set STP Controls command sets control and time information at the STP facility. The Set STP Controls command is executed synchronously. These commands, along with their mnemonics and other relevant properties are summarized in the following table:

TABLE I

| Name | Mnemonic | Characteristics | | | Command Code |
|---|---|---|---|---|---|
| | | A | F | I | |
| Set STP Controls | SSTPC | — | — | — | 0033 |
| Store STP Information | SSTPI | — | — | — | 0038 |
| Store STP Information Fast | SSTPF | — | F | I | 1040 |
| Store STP Link Information | SSTPL | — | — | I | 003A |
| Store STP Network Node Identifiers | SSTPN | — | — | I | 003C |
| Store Time Zone Information | STZI | — | — | I | 003E |

In the table above, the following is the key for the "characteristics" column:

A—The command can be executed asynchronously;
F—The synchronous command is executed quickly;
I—The command can be executed interpretively.

Set STP Controls

The Set STP Controls command uses a control block for purposes of communicating with the STP facility. In particular, it is seen in FIG. 1 that bytes 0-1 of word 0 contain the value "0020" hex, specifying a command-request-block length of 32 bytes. The Command Code is found within bytes 2-3 of word 0 which contains the value "0033" hex, specifying the set-STP-controls command. Places in FIG. 1 that show "Reserved" locations denote areas set aside for other possible future uses. The field labeled "FMT" in the block of FIG. 1 forms the command-request-format field and it contains a 4-bit, unsigned integer whose value specifies the layout of the command-request block. Byte 0 of word 2 contains the STP Operation field and contains an operation code defined as follows:

Code 1: Sync Clock: If the CPC is in the STP-timing mode and the STP-clock-source state indicates the usable-clock-source state, the sync-clock operation causes the Time of Day (TOD) clock to be synchronized with Coordinated Server Time (CST). The timing state for the Central Processing Complex (CPC) is set to the synchronized state as a result of the operation. The TOD-clock-change field in the response block specifies the amount the TOD clock is modified. If the CPC is not in the STP-timing mode, a response code of "0109" hex applies and the TOD clock is not modified. If the CPC does not have a usable clock source, a response code of "0108" hex applies and the TOD-clock is also not modified.

Code 3: Set-Controls: The set-controls operation sets the STP controls for the CPC to the values provided in the STP Controls field in the request block. The values specified in the STP controls field in the request block replace the existing settings for the CPC. STP-operation codes that are not defined are reserved.

STP Controls: When STP operation code 3 is specified in byte 0 of word 2, bytes 2-3 of word 2 contain the STP Controls field. Any combination of defined bits may be set to one and the settings replace the current settings for the CPC. When the STP operation code 3 is not specified, the field is ignored. The field is defined as follows.

Bit 0: STP-sync-check control: Bit 0 of the STP controls field, when set to one, enables STP-sync-check machine checks. When set to zero, STP-sync-check machine checks are disabled.

Bit 1: Island-condition control: Bit 1 of the STP controls field, when set to one, enables island-condition machine checks. When set to zero, island-condition machine checks are disabled.

Bit 2: CTN-configuration-change control: Bit 2 of the STP controls field, when set to one, enables CTN-configuration-change machine checks. When set to zero, CTN-configuration-change machine checks are disabled.

Bit 3: STP-clock-source-error control: Bit 3 of the STP controls field, when set to one, enables STP-clock-source-error machine checks. When set to zero, STP-clock-source-error machine checks are disabled.

Bit 8: Timing-status-change-alert control: Bit 8 of the STP controls field, when set to one, enables timing-status-change external interrupts. When set to zero, timing-status-change external interrupts are disabled.

Bit 9: Link-availability-change-alert control: Bit 9 of the STP controls field, when set to one, enables link-availability-change external interrupts. When set to zero, link-availability change external interrupts are disabled.

Bit 10: Time-control-parameter-alert control: Bit 10 of the STP controls field, when set to one, enables time-control-parameter-alert external interrupts. When set to zero, STP-time-control parameter-alert external interrupts are disabled.

Bits in the STP-controls field that are not defined are reserved. The STP-controls field is set to zero as part of a subsystem reset. It is noted that programs can determine the current sync-check offset by issuing the Store STP Information command. The sync-check amount is stored at words 40-43 of the Store STP Information response block.

Attention is now directed to the structure of a suitable Response Block for use with the Set STP Controls command. This block has the structure shown in FIG. 2.

L2: Bytes 0-1 of word 0 specify the length in bytes of the command-response block. The length depends on the response code that is stored as a result of the attempt to execute the command. If a response code other than "0001" hex is stored in the response-code field, STP control information for the configuration would not have been modified as a result of the attempt to execute the command and, in this case, L2 specifies a length of eight bytes for the command-response block. If a response code of "0001" hex is stored in the response-code field, the specified STP control information has been set for the configuration as a result of the attempt to execute the command and L2 specifies a length of 32 bytes for the command-response block.

Response Code: Bytes 2-3 of word 0 contain a 16-bit unsigned binary integer that describes the results of the attempt to execute the command.

Reserved: This portion of the block is set aside for possible future use.

Format (FMTD: Bits 4-7 of word 1 are the command-response-format field that contains a 4bit, unsigned integer whose value specifies the layout of the command-response block. The value of the field is set to zero.

TOD Clock Change: When operation code 1 or 4 is set in the STP Operation field and response code "0001" hex is stored, words 4-5 contain a signed binary integer indicating the amount that the TOD clock is changed as a result of the operation. When the value in the STP Operation field is not equal to 1 or 4, this field is stored as zeros. The stored value has a resolution equal to TOD-clock bit 63 in current embodiments.

Special Conditions: A special condition exists if a response code other than "0001" hex is stored in the command-response block, indicating that the execution of the command is suppressed. The special conditions for the set-STP-Controls command are as follows:

"0003": Response code "0003" hex specifies that the L1 field contains a value other than 0020 hex, a reserved field in the request block is not zero, or the STP operation code field specifies a reserved value.

"0004": Response code "0004" hex specifies that the command is not provided by the model.

"0007": Response code "0007" specifies that the command contains an invalid FMT value.

"0102": Response code "0102" hex specifies that the command could not be performed because the STP facility is installed but is not enabled.

"0108": Response code "0108" hex specifies that the sync-clock operation is specified and the CPC does not have a valid clock source.

"0109": Response code "0109" hex specifies that the sync-clock operation is set and the CPC is not in STP-timing mode.

"010A": Response code "010A" hex specifies that the sync-clock operation is specified but the clock cannot be synchronized because the TOD clock is in the stopped state.

Store STP Information

Next is considered the "Store STP Information" command. The store-STP-information command returns information about the STP facility including CTN ID, timing status information, time-control parameters and the current timing parameters that are being used to perform clock synchronization. The information provided indicates the state of the STP-facility at the time specified by the data-timestamp field in the response block. The store-STP-information command is executed synchronously. The command-request block has the format shown in FIG. 3. The fields present in this block are specified as follows:

L1: Bytes 0-1 of word 0 contain the value "0010" hex, specifying a command-request-block length of 16 bytes.

Command Code: Bytes 2-3 of word 0 contain the value "0038" hex, specifying the store STP-information command.

Reserved: This portion of the block is set aside for possible future use.

Format (FMTD: Bits 4-7 of word 1 are the command-request-format field that contains a 4-bit, unsigned integer whose value specifies the layout of the command-request block.

The command-response block for the subject command has the format shown in FIGS. 4A and 4B (connected by the arrow shown) and is described as follows:

L2: Bytes 0-1 of word 0 specify the length in bytes of the command-response block. The length depends on the response code that is stored as a result of the attempt to execute the command. If a response code other than "0001" hex is stored in the response-code field, no STP information has been stored as a result of the attempt to execute the command, and L2 specifies a length of eight bytes for the command-response block. If a response code of "0001" hex is stored in the response-code field, STP information has been stored in the command-response block and L2 specifies a command-response-block length of 384 bytes.

Response Code: Bytes 2-3 of word 0 contain a 16-bit unsigned binary integer that describes the results of the attempt to execute the command.

Reserved: This portion of the block is set aside for possible future use.

Format (FMTD): Bits 4-7 of word 1 are the command-response-format field that contains a 4 bit, unsigned integer whose value specifies the layout of the command-response block.

Time zone Update Scheduled (TU): Bit 0 of word 2, when set to one, indicates that a time zone-update is scheduled. When the bit is set to zero, a time zone-update is not scheduled. The time zone update is specified by the time zone-control parameters-information block provided in the response block of the store-time zone information command.

Leap Seconds Offset Update Scheduled (LU): Bit 1 of word 2, when set to one, indicates that a leap-seconds-offset-update is scheduled. When the bit is set to zero, a leap-seconds-offset-update is not scheduled. The leap-seconds-offset-update is specified by the leap-seconds-offset-information block provided in the response block of the store-time zone-information command.

Stratum: Bits 8-15 of word 2 contain an unsigned binary integer indicating the stratum level of the CPC at the time the command was executed.

Validity Bits: Bytes 2-3 of word 2 contain validity bits for one or more of the fields in the response block. When set to one, the bit indicates that the specified field is valid. When set to zero, the bit indicates that the specified field is invalid. The bits that indicate the validity of response block fields are described below:

TABLE II

| Bit Field | Description |
|---|---|
| 0 | Leap Seconds field valid |
| 1 | Time Zone Offset field valid |
| 2 | Daylight Savings Time Offset field valid |
| 3 | Reserved |
| 4 | Total Time Offset field valid |
| 5-15 | Reserved |

Leap Seconds: Bytes 0-1 of word 3, when valid, contain a signed integer indicating the number of leap seconds that are currently in effect for the CPC.

Timing Mode (TMD): Bits 16-19 of word 3 contain a 4-bit code that specifies the timing mode of the CPC. The codes are defined as follows:

TABLE III

| Code | Code Meaning |
|---|---|
| 0 | Local Timing Mode |
| 1 | ETR Timing Mode |
| 2 | STP Timing Mode |

TABLE III-continued

| Code | Code Meaning |
|---|---|
| 3-14 | Reserved |
| 15 | Uninitialized Timing Mode |

CTN Type (CTN): Bits 20-23 of word 3 contain a 4 bit code that specifies the type of CTN timing network that is configured at the CPC. The codes are defined as follows:

TABLE IV

| Code | Meaning |
|---|---|
| 0 | No CTN defined: the CPC is not configured for attachment to a CTN (that is, an STP network is not defined). The CPC is either configured for attachment to an ETR-only timing network or to no timing network at all. |
| 1 | STP-only CTN: the CPC is configured for attachment to a CTN that does not include an ETR network. |
| 2 | Mixed CTN: the CPC is configured for attachment to a CTN that includes an ETR network. |
| 3-15 | Reserved. |

Local Clock Server (L): Bit 26 of word 3 indicates whether the server is permitted to act as a local clock server. When the bit is one, the server can act as a local clock server; when the bit is zero, the server can not act as a local clock server. This is the "L" part of the field labeled "00LC" in FIG. 4A.

STP Clock Source State (C): Bit 27 of word 3, when set to one, indicates that the CPC has a usable clock source. When the bit is zero, the CPC does not have a usable clock source. This is the "C" part of the field labeled "00LC" in FIG. 4A.

STP Timing State (TST): Bits 28-31 of word 3 contain a 4-bit code that specifies the timing state at the CPC. The codes are defined as follows:

TABLE V

| Code | Meaning |
|---|---|
| 0 | Unsynchronized |
| 1 | Synchronized with the timing network |
| 2 | Physical Clock Stopped |
| 3-15 | Reserved |

Time Zone Offset: Bytes 0-1 of word 4, when valid, contain a signed binary integer indicating the time zone difference from UTC currently in effect at the STP facility. The value is provided in minutes with the low order bit equaling one minute.

Daylight Savings Time (DST) Offset: Bytes 2-3 of word 4, when valid, contain a signed binary integer indicating the local daylight savings offset currently in effect at the STP facility. The value is provided in minutes with the low order bit equaling one minute.

STP Controls: Bytes 0-1 of word 5 contain the current setting of STP Controls field and is defined as follows. Bits in the STP-controls field that are not defined are reserved.

TABLE VI

| Code | Meaning |
|---|---|
| 0 | STP-sync-check control: Bit 0 of the STP controls field, when set to one, indicates STP-sync-check machine checks are enabled. When set to zero, STP-sync-check machine checks are disabled. |

TABLE VI-continued

| Code | Meaning |
|---|---|
| 1 | Island-condition control: Bit 1 of the STP controls field, when set to one, indicates island-condition machine checks are enabled. When set to zero, island-condition machine checks are disabled. |
| 2 | CTN-configuration-change: Bit 2 of the STP controls field, when set to one, indicates CTN-configuration-change machine checks are enabled. When set to zero, CTN-configuration change machine checks are disabled. |
| 3 | STP-clock-source-error: Bit 3 of the STP controls field, when set to one, indicates STP-clock-source-error machine checks are enabled. When set to zero, STP-clock-source error machine checks are disabled. |
| 8 | Timing-status-change alert—Bit 8 of the STP controls field, when set to one, indicates timing-status-change external interrupts are enabled. When set to zero, timing-status change external interrupts are disabled. |
| 9 | Link-availability-change alert: Bit 9 of the STP controls field, when set to one, indicates link-availability-change external interrupts are enabled. When set to zero, link-availability-change alert external interrupts are disabled. |
| 10 | Time-control-parameter-alert control: Bit 10 of the STP controls field, when set to one, indicates time-control-parameter-alert external interrupts are enabled. When set to zero, time-control-parameter-alert external interrupts are disabled. |

Total Time Offset: Word 6, when valid, indicates the total time offset that is in effect at the STP facility. It is the combination of the daylight savings time and time zone adjustments that are in effect at the CPC. When the DST-offset field and the time zone-offset are valid, the field is equal to the sum of these fields. When one or both of these fields are not valid, the total-time-offset field indicates an offset that is provided to the STP facility without specifying individually the DST-offset and time zone-offset fields. The value is provided in minutes with the low order bit equaling one minute.

Maximum Timing Stratum Level: Byte 0 of word 7 contains a 1-byte unsigned binary integer that specifies the maximum stratum level that a server can be set at and be in the synchronized state. A server with a stratum level greater than the maximum-timing-stratum level is in the unsynchronized timing state and the not-usable clock source state.

Maximum Stratum Level: Byte 1 of word 7 contains a 1-byte unsigned binary integer that specifies the maximum stratum level that can be set for any server in the CTN.

Maximum Version: Byte 2 of word 7 contains a 1-byte unsigned binary integer from 0-255 that indicates the maximum STP version number supported by the CPC with zero being lowest and 255 being the highest possible version supported.

Active Version: Byte 3 of word 7 contains a 1 byte unsigned binary integer in the range of 0 to the value in the maximum-version field that indicates the STP version number that is currently active at the CPC.

CTN ID: Words 8-10 contain the 12-byte CTN ID for the CPC and has the following format:

TABLE VII

| STP Network ID | ETR Network Number |
|---|---|

STP Network ID: Bytes 0-7 of the CTN ID identify the STP network, if any, that is configured for the CPC. The values for this field are defined as follows:

TABLE VIII

| Hex Value | Meaning |
|---|---|
| 0000 0000 0000 0000 | Null - the server is not configured to be part of a CTN |
| 0000 0000 0000 0001-<br>FFFF FFFF FFFF FFEF | The server is configured to be part of a CTN. The value identifies the STP network for the CTN. |
| FFFF FFFF FFFF FFF0-<br>FFFF FFFF FFFF FFFF | Reserved |

ETR Network Number: Bytes 8-11 of the CTN ID identify the ETR network number that is configured for the CPC. The field is defined as follows:

TABLE IX

| Zeros | ETR Net ID |
|---|---|

ETR Net ID: Bits 24-31 of the ETR Network Number identify the ETR network, if any, that is configured for the CPC. The values for this field are defined as follows:

TABLE X

| Hex Value | Meaning |
|---|---|
| 00-1F | The CPC is configured for attachment to an ETR network that is identified by this value. |
| 20-FE | Reserved |
| FF | The CPC is not configured for attachment to an ETR network. |

TOD-Clock Offset: Words 12-13 contain the TOD-clock offset value for the server. Bit 63 has a resolution equal to that of bit 63 of the TOD clock.

CST Offset: Words 16-17 contain the difference between the TOD clock and the Coordinated Server Time (CST) for the timing network. Bit 63 has a resolution equal to that of bit 63 of the TOD clock. For stratum-1 and stratum-0 servers, this field is set to zero.

CST Route Delay: Words 20-21 contain a 64-bit signed binary integer indicating the total roundtrip message delay to the selected stratum-1 server from this server. Bit 63 has a resolution equal to that of bit 63 of the TOD clock. For stratum-1 and stratum-0 servers, this field is set to zero.

CST Dispersion: Words 22-23 contain a 64-bit unsigned binary integer indicating the dispersion of CST. Bit 63 has a resolution equal to that of bit 63 of the TOD clock.

Maximum Skew Rate: Word 24 contains an unsigned 32-bit binary number that specifies the absolute value of the unknown skew rate of the TOD clock at a secondary server relative to the stratum-1 server selected as the root clock source. The value is equal to the maximum oscillator frequency skew and, in an STP-only CTN, the maximum unrecognized primary reference time (PRT) correction that can occur. The value has a resolution of one part per 244.

CST Reference Timestamp: Words 28-29 contain the timestamp indicating when the CST offset reported in words 16-17 was updated. For stratum1 and stratum-0 servers, the field is set to zero. The field is in STP-timestamp format.

CST Reference Identifier: Words 32-39 contain a 32-byte value that identifies the source of the reference time for the server. For stratum-1 servers, it identifies the type of primary-reference time source in the form of a left-justified 4-byte EBCDIC code; for secondary servers it contains the node descriptor of the CPC selected to provide CST. The field has the following values for stratum-i servers:

TABLE XI

| Code | Meaning |
| --- | --- |
| CPPS | Console PPS time service |
| CDTS | Console dial-up time service |
| CMAN | Console manually set time |
| CGPS | Console GPS connection |
| CNTP | Console using NTP |
| ETRS | ETR-9037 stepping connection |
| PPSC | Direct attach PPS with console as reference source. |
| DETS | Direct attach ETS |
| DGPS | Direct attach GPS |
| ETRN | ETR-9037 providing a primary reference |

Sync-Check Offset: Words 40-43 contain the sync-check offset for the guest issuing the operation. The field is in extended-TOD-clock format.

Data Timestamp: Words 44-45 contain bits 0-63 of the TOD clock at the time the data in the response area was stored.

Stratum-1 Configuration Information Block: Words 48-74 contain the stratum-1-configuration information block (SCIB) for the CPC. When the server is configured to be part of an STP-only CTN, the block contains the stratum-1 configuration for the STP-only CTN. When the CPC is not configured to be part of an STP-only CTN, the field is meaningless.

PRT Correction Steering Information Block: Words 80-95 contain the primary-reference-time correction-steering-information block (PCSIB). When the CPC is configured to be part of an STP-only CTN, the block contains information regarding the primary-reference time for the CTN. When the CPC is not configured to be part of an STP-only CTN, the field is meaningless.

Special Conditions: A special condition exists if a response code other than "0001" hex is stored in the command-response block, indicating that the execution of the command is suppressed. The special conditions for the store-STP-information command are as follows:

TABLE XII

| Code | Meaning |
| --- | --- |
| "0003" | Response code "0003" hex specifies that the L1 field contains a value other than 0010 hex or a reserved field in the request block is not zero. |
| "0004" | Response code "0004" hex specifies that the command is not provided by the model. |
| "0007" | Response code "0007" hex specifies that the command specifies an invalid format. |
| "0102" | Response code "0102" hex specifies that the command could not be performed because the STP facility is installed but is not enabled. |

Store STP Information Fast

Figure 5:
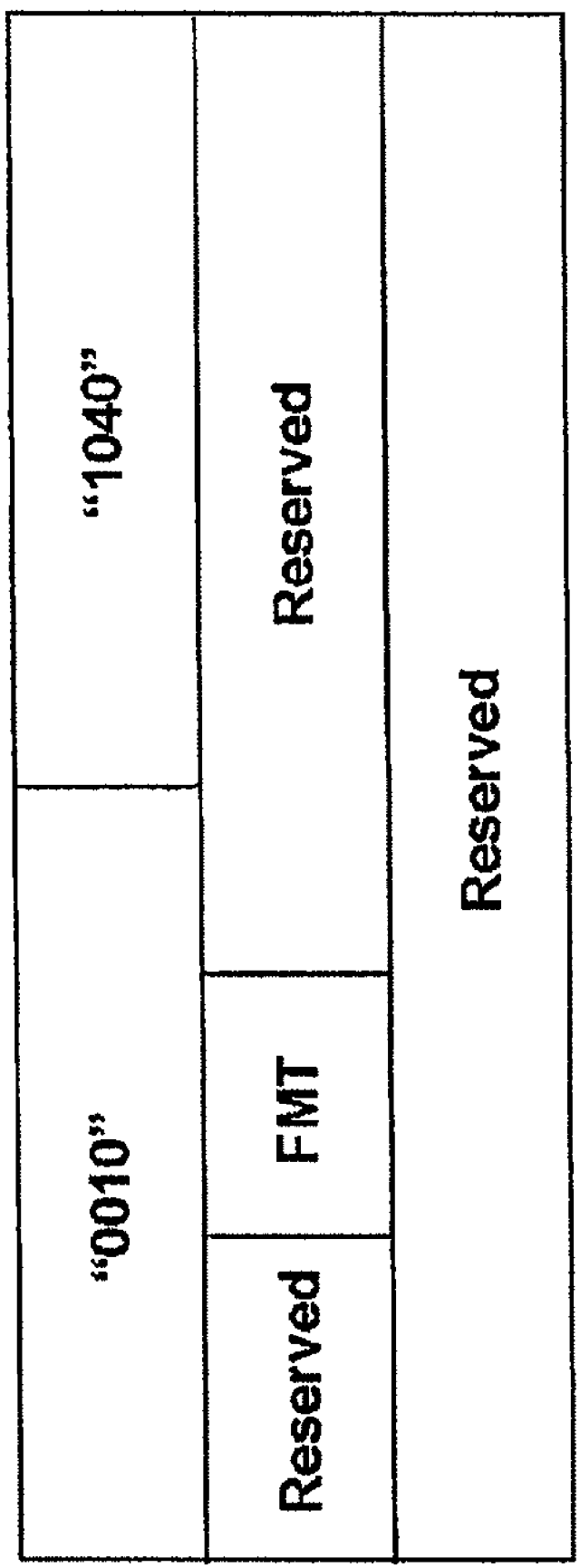
FIG. 5 is a block diagram illustrating a useful structure for the Command-Request Block for the Store STP Information Fast command.

Next is considered the Store STP Information Fast command. The store-STP-information-fast command returns information about the STP facility including the CTN ID and the timing state. The information returned is a subset of the information provided by the Store STP Information command. The store-STP-information-fast command is executed synchronously and can be interpretively executed using the SIE facility. The command-request block for this command has the format shown in FIG. 5.

L1: Bytes 0-1 of word 0 contain the value "0010" hex, specifying a command-request-block length of 16 bytes.

Command Code: Bytes 2-3 of word 0 contain the value "1040" hex, specifying the store-STP information-fast command.

Reserved: The fields so labeled are set aside for possible future use.

Format (FMTI: Bits 4-7 of word 1 are the command-request-format field that contains a 4-bit, unsigned integer whose value specifies the layout of the command-request block.

Attention is now directed to the structure of the Command-Response Block for the Store STP Information Fast command. This structure is illustrated in FIG. 6. The following fields and their uses are described below:

L2: Bytes 0-1 of word 0 specify the length in bytes of the command-response block. The length depends on the response code that is stored as a result of the attempt to execute the command. If a response code other than "0001" hex is stored in the response-code field, no STP information has been stored as a result of the attempt to execute the command, and L2 specifies a length of eight bytes for the command-response block. If a response code of "0001" hex is stored in the response-code field, STP information has been stored in the command-response block and L2 specifies a command-response-block length of 64 bytes.

Response Code: Bytes 2-3 of word 0 contain a 16-bit unsigned binary integer that describes the results of the attempt to execute the command.

Reserved: All fields so labeled are set aside for possible future use; all such fields may be provided with a default value for convenience. All such fields in this block are served by this description.

Format (FMT): Bits 4-7 of word 1 are the command-response-format field that contains a 4 bit, unsigned integer whose value specifies the layout of the command-response block.

Timing Mode (TMD): Bits 16-19 of word 3 contain a 4-bit code that specifies the timing mode of the CPC. The codes are defined as follows:

TABLE XIII

| Code | Meaning |
| --- | --- |
| 0 | Local Timing Mode |
| 1 | ETR Timing Mode |
| 2 | STP Timing Mode |
| 3-14 | Reserved |
| 15 | Uninitialized Timing Mode |

Timing State (TST): Bits 28-31 of word 3 contain a 4-bit code that specifies the timing state of the system TOD clock. The codes are defined as follows:

TABLE XIV

| Code | Meaning |
| --- | --- |
| 0 | Unsynchronized |
| 1 | Synchronized with the timing network |
| 2 | Physical Clock Stopped |
| 3-15 | Reserved |

CTN ID: Words 8-10 contain the 12-byte CTN ID for the CPC.

Special Conditions: A special condition exists if a response code other than "0001" hex is stored in the command-response block, indicating that the execution of the command is suppressed. The special conditions for the store-STP-information-fast command are as follows:

"0003": Response code "0003" hex specifies that the L1 field contains a value other than "0010" hex or a reserved field in the request block is not zero.

"0004": Response code "0004" hex specifies that the command is not provided by the model.

"0007": Response code "0007" hex specifies that the command contains an invalid format.

"0102": Response code "0102" hex specifies that the command could not be performed because the STP facility is installed but is not enabled.

Store STP Link Information

Figure 7:
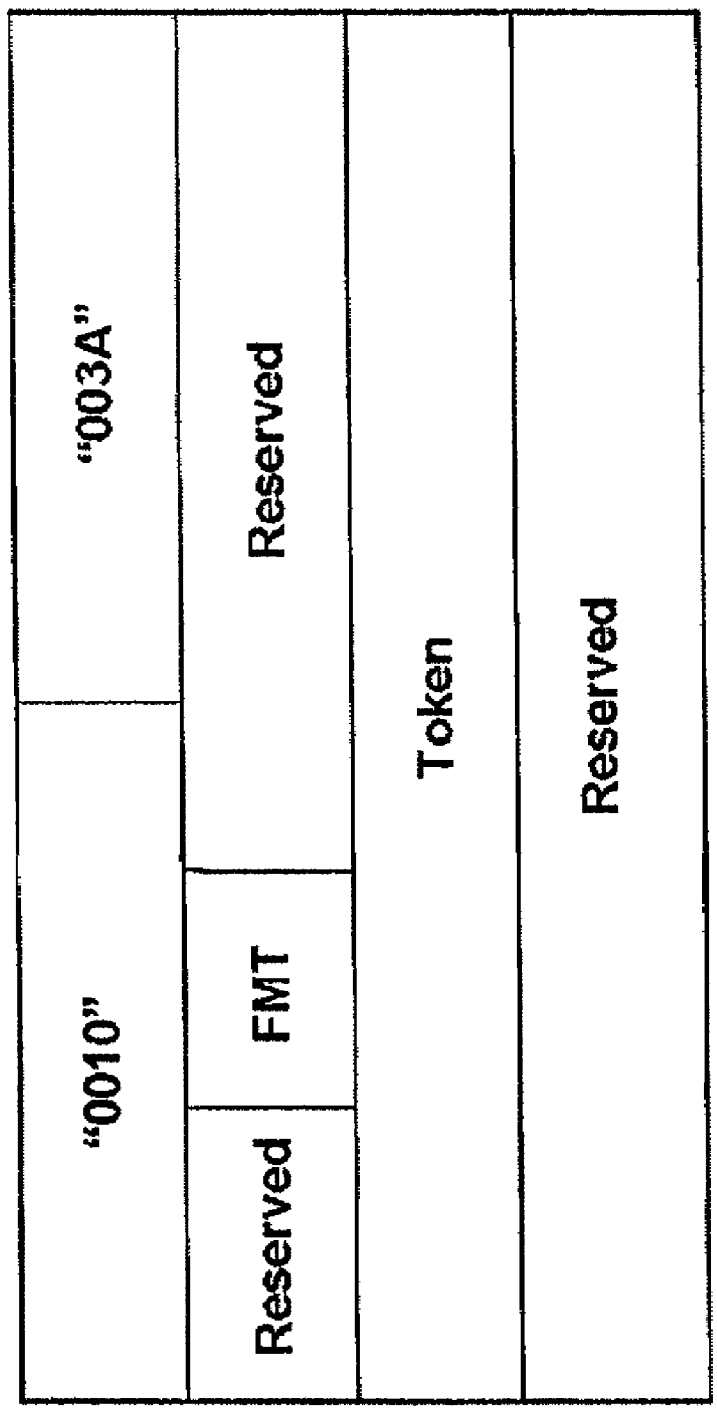
FIG. 7 is a block diagram illustrating a useful structure for the Command-Request Block for the Store STP Link Information command.

Attention is now directed to the Store STP Link Information command and the description of its Request and Response blocks. The store-STP-link information command is used to store link information for each link at the CPC that is capable of supporting STP message communication. The store-STP-link information command is executed synchronously. The command-request block has the format shown in FIG. 7.

L1: Bytes 0-1 of word 0 contain the value "0010" hex, specifying a command-request-block length of 16 bytes.

Command Code: Bytes 2-3 of word 0 contain the value "003A" hex, specifying the store-STP-link information command.

Reserved: set aside for possible future use.

Format (FMT): Bits 4-7 of word 1 form the command-request-format field that contains a 4-bit, unsigned integer whose value specifies the layout of the command-request block.

Token: Word 2 contains a 32-bit unsigned binary integer that, when non-zero, requests that additional link-information blocks be stored. The token may be set to a non-zero value when the response block from the immediately previous store-STP-link-information command issued from this configuration contained a non-zero token. A non-zero token in a response block indicates that additional link-information blocks were available and, when the token is set in the next request, additional link information blocks will be provided in the response block. The token field is set to zero when the request is not for additional blocks.

Figure 8:
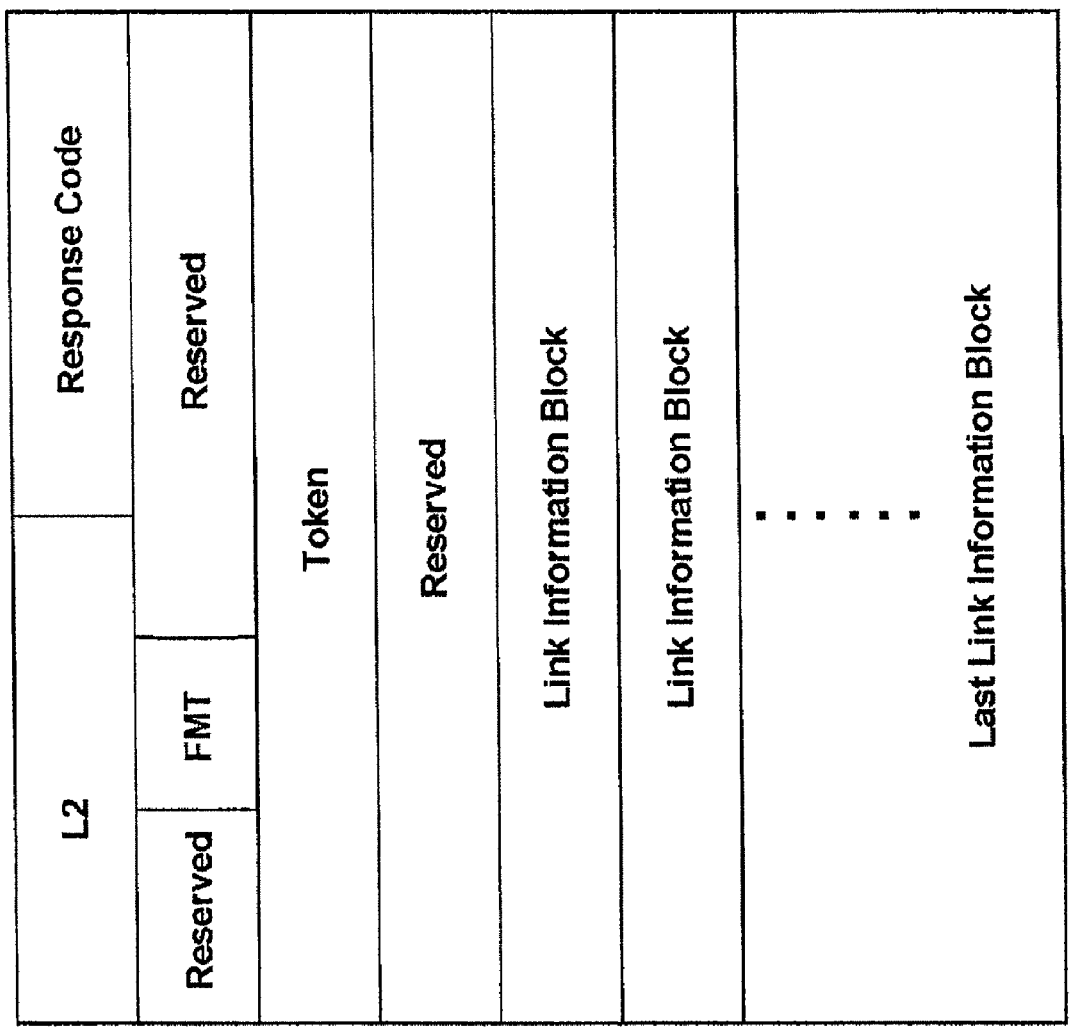
FIG. 8 is a block diagram illustrating a useful structure for the Command-Response Block for the Store STP Link Information command.

Next is considered the Response Block for the Store STP Link Information command. The structure of this block is set out in FIG. 8. The fields employed and their meanings are as follows:

L2: Bytes 0-1 of word 0 specify the length in bytes of the command-response block. The length depends on the response code that is stored as a result of the attempt to execute command. If a response code other than "0001" hex is stored in the response-code field, no link-information blocks are stored as a result of the attempt to execute the command, and L2 specifies a length of eight bytes for the command-response block. If a response code of "0001" hex is stored in the response-code field, one or more STP link-information blocks are stored in the command-response block. L2 specifies a command-response-block length of 112 bytes plus 128 bytes for each STP link-information block that is stored. The program can determine the number of STP link-information blocks that are stored by subtracting 112 from the size of the command-response block and dividing the remainder by 128.

Response Code: Bytes 2-3 of word 0 contain a 16-bit unsigned binary integer that describes the results of the attempt to execute the command.

Reserved: Set aside for possible future use as described above (applicable to all such fields in this block and elsewhere herein).

Format (FMTD: Bits 4-7 of word 1 form the command-response-format field that contains a 4 bit, unsigned integer whose value specifies the layout of the command-response block.

Token: Word 2 contains a 32-bit unsigned binary integer that indicates whether additional, unread link-information blocks remain at the STP facility. A value of zero indicates that no additional, unread link-information blocks remain at the STP facility. A non-zero value indicates additional, unread link-information blocks are available at the STP facility and that the token, when set in the next store-STP link-Information command issued from this configuration, will retrieve additional link-information blocks. The token is valid only for next Store STP Link Information issued from the configuration.

Words 28-n: If a response code of "0001" hex is stored in the response-code field, up to 31,128 byte STP link-information blocks are stored in words 28-n. STP-Link-information blocks are stored for all STP-capable links. Link-information blocks are not stored for physical channels that are not capable of supporting STP messaging. Each STP-link-information block has the structure that is shown in FIG. 9.

STP-Link Identifier (SLID): Bytes 0-1 of word 0 contains the identifier for the STP link being described by this STP link-information block. Each STP-capable link in a CPC has a unique SLID that is assigned by the STP facility.

DESC: Byte 2 of word 0 contains a code which describes the STP-link type for the link being described by this link-information block. The codes are defined as follows:

TABLE XV

| Code | Meaning |
| --- | --- |
| 00 | Reserved |
| 01 | Coupling-peer link |

TABLE XV-continued

| Code | Meaning |
| --- | --- |
| 02 | Infiniband link |
| 03-FF | Reserved |

Initialized (I): Bit 24 of word 0, when set to one indicates that the STP path is in the STP initialized state and is available for STP messaging. When the bit is zero, the STP path is in the STP uninitialized state. The uninitialized reason code in bits 28-31 of word 0 specifies the reason that the path is uninitialized.

Uninitialized Reason Code (URC): Bits 27-31 of word 0 are valid when the STP path for this link is in the uninitialized state and contain a 5-bit code that indicates the reason that the path is in the uninitialized state. The codes are defined below in Table XVI and are in order of decreasing priority. The code stored for a path represents the most recent condition recognized for the path. When multiple conditions can be detected concurrently, the higher priority condition is reported. Unspecified codes for the URC field are reserved.

TABLE XVI

| Hex Code | Meaning |
| --- | --- |
| 0 | Offline: the physical link is in the offline state. A link in the offline state can not be initialized for STP communication and is considered not operational. |
| 1 | Initialization Not Complete: the physical link is operational but path initialization has not been attempted or is in progress but has not entered states X'E' or X'F'. |
| 2 | Link Failure: a link failure has been detected on the physical link. A link in the link-failure state can not be initialized for STP communication and is considered not operational. |
| 3 | Fenced: the link is operational but has been put into the fenced state and can not be initialized. A link in the fenced state can not be initialized for STP communication and is considered not operational. |
| 4 | Incoming ESP Command Reject: the server responded to an ESP message command with a response code other than 0001 hex. The response code sent to the attached server is stored in byte 0 of word 1. |
| 5 | Outgoing ESP Command Reject: the server received a response code of other than 0001 hex to an ESP message command. The response code that was received from the attached server is stored in byte 0 of word 1. |
| 6 | Communication Error: a communication error has been recognized for the attached server indicating that the attached server has not communicated with this server for a period greater than the freewheel period. |
| 7 | Configuration Error: a configuration error has been recognized for the attached server indicating the attached server has provided a mismatched CTN ID on one of the paths to the attached server. |
| 8 | Removed Path: a remove-STP-path command has been received from the attached server. |
| D | No Response: an ESP command has been attempted but did not receive a response within the message timeout period. |
| E | Incoming ESP Command Pending: the server has received a response code of 0001 hex for an ESP command sent to the attached node and is waiting for an ESP command from the node to complete the path initialization process. |
| F | Outgoing ESP Command Pending: the server has responded with a response code of 0001 hex to an ESP command from the attached node and must send an ESP command to the node to complete the path initialization process. |

Establish STP Path (ESP) Response Code: Byte 0 of word 1 contains an ESP response code when the URC contains code 4 or 5.

Stratum Level: Byte 1 of word 1 contains the stratum level of the attached server.

Attached CTN ID: Words 2-4 contain the CTN ID of the attached CPC as reported by the attached CPC on the STP link. The field contains valid data when the I bit equals one or the URC field contains a value of 5.

Link Node Descriptor: The link node descriptor contains a CPC-type node descriptor of the link being identified by this link-information block.

Attached Node Descriptor: The attached-node descriptor contains a CPC-type node descriptor of the node attached to the STP link.

Special Conditions: A special condition exists if a response code other than
"0001" hex is stored in the command-response block, indicating that the execution of the command is suppressed. The special conditions for the store-STP-link-information command are as follows:
"0003": Response code "0003" hex specifies that the L1 field contains a value other than "0020" hex or a reserved field in the request block is not zero.
"0004": Response code "0004" hex specifies that the command is not provided by the model.
"0007": Response code "0007" hex specifies that the command specifies an invalid format.
"0102": Response code "0102" hex specifies that the command could not be performed because the STP facility is installed but is not enabled.

Store STP Network Node Identifiers

Figure 10:
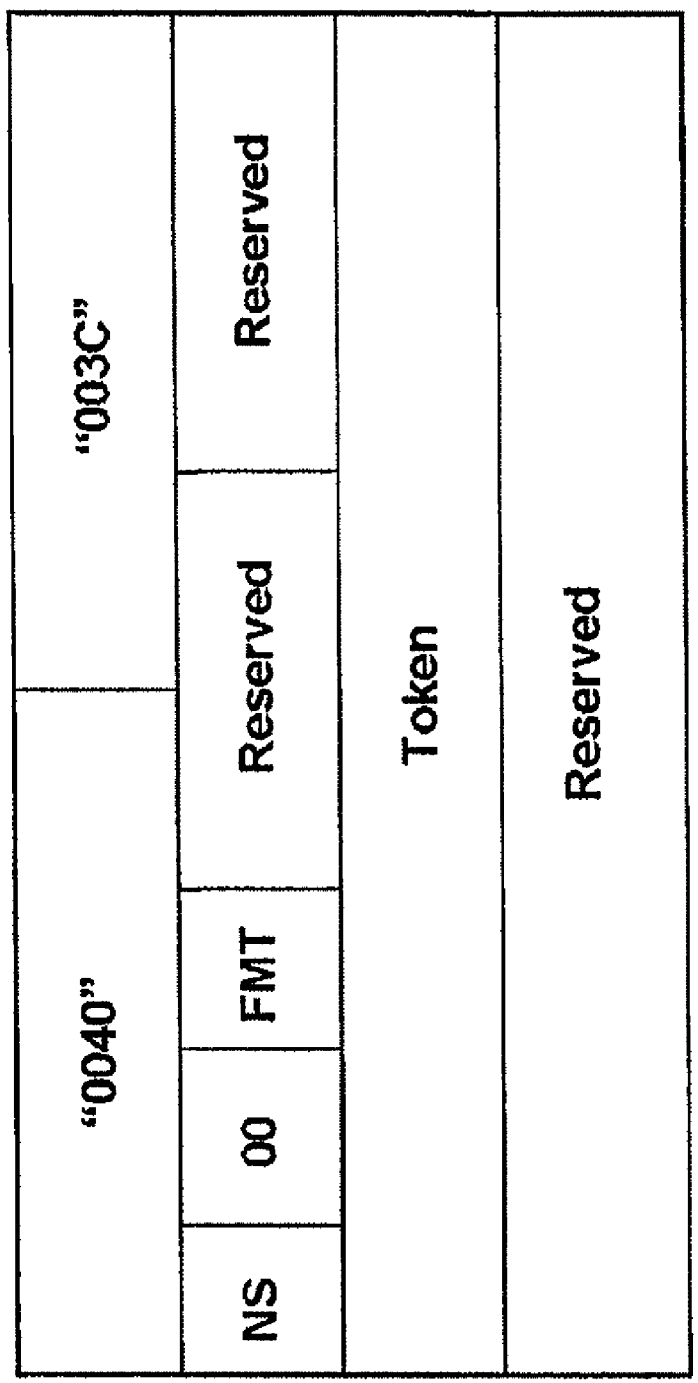
FIG. 10 is a block diagram illustrating a useful structure for the Command-Request Block for the Store STP Network Node Identifiers command.

Attention is now directed to a description of the Store STP Network Node Identifiers command and its corresponding Request and Response Blocks. The store-STP-network-node-identifiers command is used to store node identification information for nodes in the STP network to which this CPC belongs. The execution of the store-STP-network node-identifiers command does not change any information contained in the channel subsystem. The information provided in node descriptors is maintained by the STP facility and does not require an access to the STP network at the time of the command. The store-STP-network-node-identifiers command is executed synchronously. The command-request block has the format shown in FIG. 10. The structure, content and meaning of the various fields employed are shown below.

L1: Bytes 0-1 of word 0 contain the value "0040" hex, specifying a command-request-block length of 64 bytes.

Command Code: Bytes 2-3 of word 0 contain the value "003C" hex, specifying the store-STP-network node-identifier command.

Node Selector (NS): Bits 0-1 word 1, contain a value that specifies the type of node that is to be identified. The meaning or each value is as follows:

0: All nodes in the STP network that are attached to the node receiving the Store STP-network-node-identifiers command are to be identified.

When this NS is specified, the node descriptor in the request block has no meaning and is ignored. Node-selector codes that are not defined are reserved.

Reserved: Set side for future use as described above.

Format (FMT): Bits 4-7 of word 1 are the command-request-format field that contains a 4-bit, unsigned integer whose value specifies the layout of the command-request block.

Token: Word 2 contains a 32-bit unsigned binary integer that, when non-zero, requests that additional node-information blocks be stored. The token may be set to a non-zero value when the response block from the immediately previous store-STP-network-node-identifiers command issued from this configuration contained a non-zero token. A non-zero token in a response block indicates that additional node-information blocks were available and, when the token is set in the next request, additional node-information blocks will be provided in the response block. The token field is set to zero when the request is not for additional blocks.

Next is considered the Response Block that is employed with the Store STP Network Node Identifiers command. Its structure is set forth in FIG. 11. The structure, content and meaning of the various fields employed are shown below:

L2: Bytes 0-1 of word 0 specify the length in bytes of the command-response block. The length depends on the response code that is stored as a result of the attempt to execute the command. If a response code other than "0001" hex is stored in the response-code field, no node descriptors are stored as a result of the attempt to execute the command, and L2 specifies a length of eight bytes for the command-response block. If a response code of "0001" hex is stored in the response-code field, one or more node descriptors are stored in the command-response block. L2 specifies a command-response-block length of 16 bytes plus 32 bytes for each node descriptor that is stored. The program can determine the number of node descriptors that are stored by subtracting 16 from the size of the command-response block and dividing the remainder by 32.

Response Code: Bytes 2-3 of word 0 contain a 16-bit unsigned binary integer that describes the results of the attempt to execute the command.

Reserved: All fields so designated are set aside for possible future use.

Format (FMT): Bits 4-7 of word 1 form the command-response-format field that contains a 4 bit, unsigned integer whose value specifies the layout of the command-response block.

Token: Word 2 contains a 32-bit unsigned binary integer that indicates whether additional, unread node-information blocks remain at the STP facility. A value of zero indicates that no additional, unread node-information blocks remain at the STP facility. A non-zero value indicates additional, unread node-information blocks are available at the STP facility and that the token, when set in the next store-STP-network-node-identifiers command issued from this configuration, retrieves additional node-information blocks. The token is valid only for next store-STP-network-node-identifiers command issued from the configuration.

Figure 12:
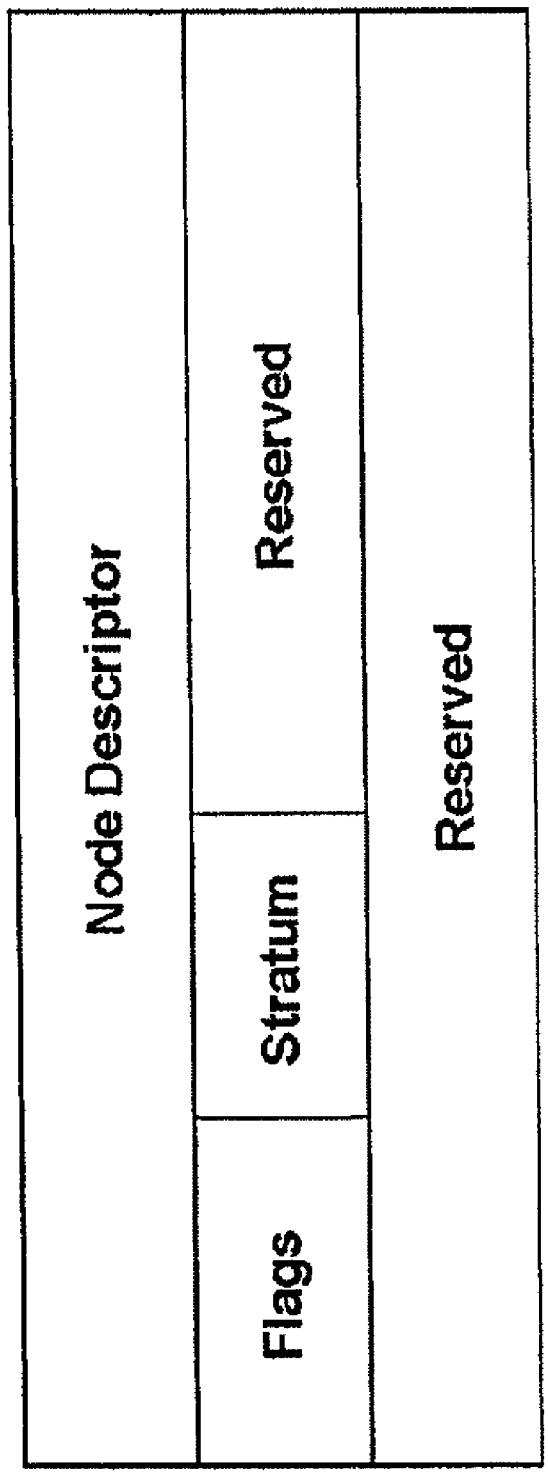
FIG. 12 a block diagram illustrating a useful structure for a description of a Node Information Block.

Node Information Blocks: If a response code of "0001" hex is stored in the response-code field, up to 62, 64-byte node-information blocks are stored in the fields shown. If all requested node-information blocks could not be stored in the response block, the token field in word 2 of the response block contains a token that can be provided on a subsequent request to obtain additional node-information blocks. Each node-information block has the format shown in FIG. 12. The structure, content and meaning of the various fields employed are shown below:

Node Descriptor: Words 0-7 of each node-information block contains a CPC-type node descriptor of a node in the STP network.

Flags: Byte 0 in word 8 contains the flags field and is defined as follows:

TABLE XVI

| Bit | Meaning |
| --- | --- |
| 0 | Attached Server - bit 0, when one, indicates the server described by the node descriptor is directly attached to this server. |
| 1 | Reporting Server - bit 1, when one, indicates the server described by this node descriptor is the server providing the network-node list. |
| 2-7 | Reserved |

Stratum Level: Byte 1 of word 8 contains the stratum level of the server.

Reserved: Set side for future use as described above.

Special Conditions: A special condition exists if a response code other than "0001" hex is stored in the command-response block, indicating that the execution of the command is suppressed. The special conditions for the store-STP-network-node command are as follows:

"0003": Response code "0003" hex specifies that the L1 field contains a value other than 0040 hex or a reserved field in the request block is not zero.

"0004": Response code "0004" hex specifies that the command is not provided by the model.

"0007": Response code "0007" hex specifies that the command specifies an invalid format.

"0102": Response code "0102" hex specifies that the command could not be performed because the STP facility is installed but is not enabled.

Store Time Zone Information

Attention is now directed to a description of the Store Time Zone Information command and its corresponding Request and Response Blocks. The Store Time Zone Information command is used to store the time zone control parameters and leap-seconds offset information for the CPC. The information provided indicates the state of the STP-facility at the time specified by the data-timestamp field in the response block. The Store Time Zone Information command is executed synchronously. The command-request block has the format shown in FIG. 13. The structure, content and meaning of the various fields employed are shown below.

L1: Bytes 0-1 of word 0 contain the value "0010" hex, specifying a command-request-block length of 16 bytes.

Command Code: Bytes 2-3 of word 0 contain the value "003E" hex, specifying the Store Time Zone Information command.

Reserved: Set aside for possible future use as discussed above.

Format (FMT): Bits 4-7 of word 1 form the command-request-format field that contains a 4-bit, unsigned integer whose value specifies the layout of the command-request block.

The command-response block for this command has the format shown in FIG. 14. The structure, content and meaning of the various fields employed are shown below.

L2: Bytes 0-1 of word 0 specify the length in bytes of the command-response block. The length depends on the response code that is stored as a result of the attempt to execute command. If a response code other than "0001" hex is stored in the response-code field, no time zone information was stored as a result of the attempt to execute the command, and L2 specifies a length of eight bytes for the command-response block. If a response code of "0001" hex is stored in the response-code field, L2 specifies a command-response-block length of 124 bytes.

Response Code: Bytes 2-3 of word 0 contain a 16-bit unsigned binary integer that describes the results of the attempt to execute the command.

Reserved: Set aside for possible future use as discussed above. This is applicable to all of the similarly labeled fields in this block.

Format (FMT): Bits 4-7 of word 1 form the command-response-format field that contains a 4 bit, unsigned integer whose value specifies the layout of the command-response block.

Data Timestamp: Words 4-5 contain bits 0-63 of the TOD clock at the time the data in the response area was stored.

Time zone Control Parameters Information Block (TCPIB): Words 28-51 contain the TCPIB for the CPC.

Leap Seconds Offset Information Block (LSOIB): Words 52-55 contain the LSOIB for the CPC.

Special Conditions: A special condition exists if a response code other than "0001" hex is stored in the command-response block, indicating that the execution of the command is suppressed. The special conditions for the Store Time Zone Information command are as follows:

"0003": Response code 0003 hex specifies that the L1 field contains a value other than "0010" hex or a reserved field in the request block is not zero.

"0004": Response code "0004" hex specifies that the command is not provided by the model.

"0007": Response code "0007" hex specifies that the command specifies an invalid format.

"0102": Response code "0102" hex specifies that the command could not be performed because the STP facility is installed but is not enabled.

The Store-Channel-Subsystem-Characteristics command is modified to include the following definitions in the general characteristics field:

Bit 68: The Server Time Protocol (STP) facility is installed. The STP-facility-enabled bit (bit 69) in the channel-subsystem general characteristics field is equal to one for the STP facility to be operational.

Bit 69: The Server Time Protocol (STP) facility is enabled. Bit 69 is meaningful only when the STP-facility-installed bit (bit 68) is one. When bits 68 and 69 are both one, the STP facility is operational. When bit 68 is one and bit 69 is zero, the STP facility is not operational and commands associated with the STP facility return a response code of "0102" hex.

The STP facility is enabled by manual means (for example, via operator controls) and, when enabled, the facility is placed into the operational state and bit 69 is stored as one when the store-channel-subsystem characteristics command is executed.

The STP-enabled characteristic is maintained through a power-on reset, Once the STP facility-enabled is set to one, the facility can only be disabled while the machine is in the power-off state.

SCLP Information: The sync-check-threshold field defined at bytes 120-127 of the SCCB returned by the Read SCP Information command is removed and the SCCB is not used by the STP facility.

The description above sets forth the structure of various blocks and fields within these blocks in terms of their sizes and positions. All such size and position parameters are mere design choices with the field sizes selected to be long enough to contain and to delineate the prescribed meanings. Positions within blocks are fundamentally arbitrary choices selected for convenience and consistency. Neither field size not field position within a block is considered to be a limitation on the scope of the invention or on the claims which describe it.

Figure 16:
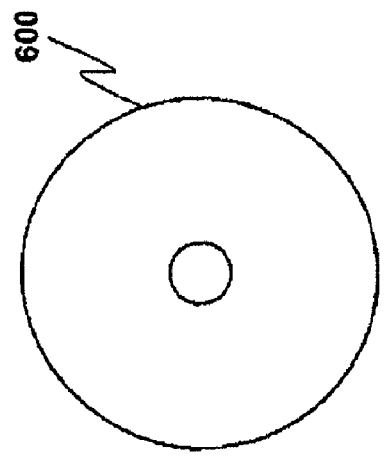
FIG. 16 is a top view of a computer readable medium that is capable of storing machine instructions, and source code as well, which implement the current invention.
Figure 15:
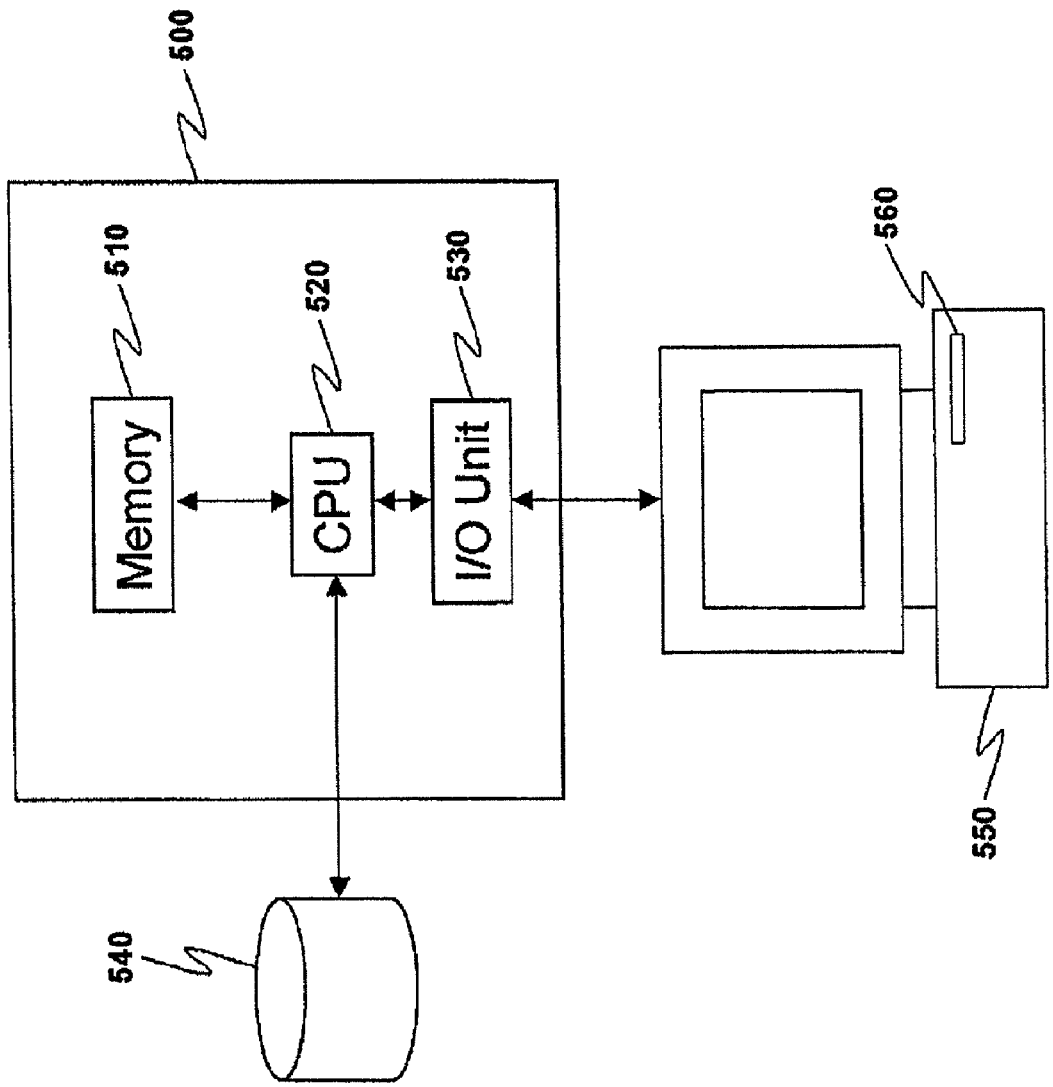
FIG. 15 is a block diagram illustrating one of the nodes in which the present invention may be employed.

In any event one of the environments in which the present invention operates is shown in FIG. 15. The present invention operates in a data processing environment which effectively includes one or more of the computer elements shown in FIG. 15. In particular, computer 500 includes central processing unit (CPU) 520 which accesses programs and data stored within random access memory 510. Memory 510 is typically volatile in nature and accordingly such systems are provided with nonvolatile memory typically in the form of rotatable magnetic memory 540. While memory 540 is preferably a nonvolatile magnetic device, other media may be employed. CPU 530 communicates with users at consoles such as terminal 550 through Input/Output unit 530. Terminal 550 is typically one of many, if not thousands, of consoles in communication with computer 500 through one or more I/O unit 530. In particular, console unit 550 is shown as having included therein a device for reading medium of one or more types such as CD-ROM 600 shown in FIG. 16. Media 600, an example of which is shown in FIG. 4, comprises any convenient device including, but not limited to, magnetic media, optical storage devices and chips such as flash memory devices or so-called thumb drives. Disk 600 also represents a more generic distribution medium in the form of electrical signals used to transmit data bits which represent codes for the instructions discussed herein. While such transmitted signals may be ephemeral in nature they still, nonetheless constitute a physical medium carrying the coded instruction bits and are intended for permanent capture at the signal's destination or destinations.

Figure 17:
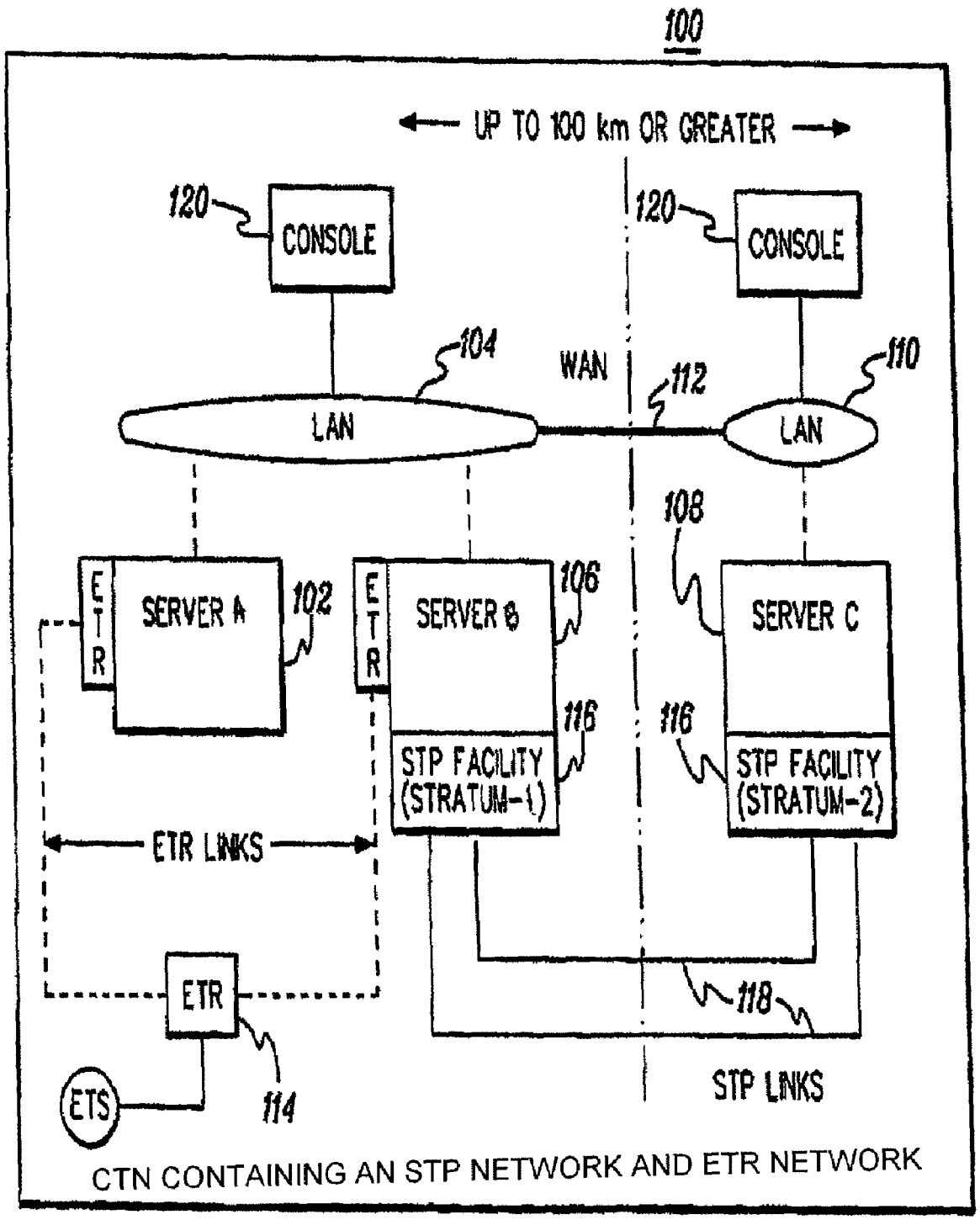
FIG. 17 depicts one example of a mixed coordinated timing network to incorporate one or more aspects of the present invention.
Figure 18:
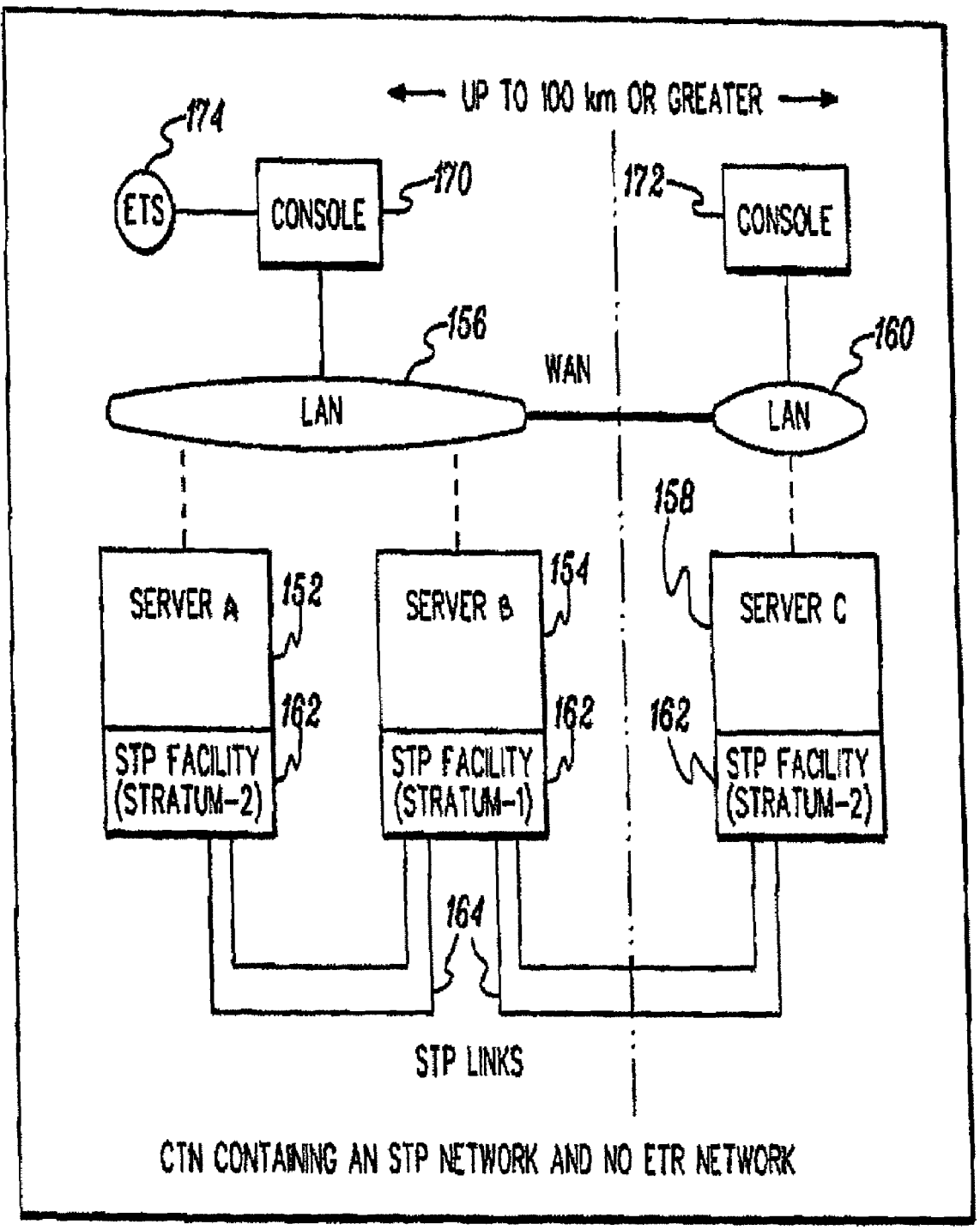
FIG. 18 depicts one example of an STP-only network which relates to one or more aspects of the present invention.

One example of a mixed CTN configuration 100 is described with reference to FIG. 17. Mixed CTN configuration 100 includes, for instance, Server A (102) coupled to a local area network (104), Server B (106) coupled to local area network (104) and Server C (108) coupled to a local area network (110). Each server is, for instance, a central processing complex based on the z/Architecture® of International Business Machines Corporation. z/Architecture® is a registered trademark of International Business Machines Corporation, Armonk, N.Y., USA. One embodiment of the z/Architecture® is described in "z/Architecture Principles of Operation," IBM Publication No. SA22-7832-04, September 2005.

Each local area network is coupled to a console 120 used in providing time synchronization within the network. Further, local area network 104 and local area network 110 are coupled to one another via a wide area network 112.

Servers A and B are coupled to an external time reference network 114, and Servers B and C are configured to be part of an STP network 116. Server B is at a stratum-1 level and Server C is at a stratum-2 level. STP links 118 are used to couple the STP facility of Server B with the STP facility of Server C.

In an STP-only CTN, the servers in the CTN are configured to be part of an STP network and none are configured to be part of an ETR network. One example of a STP-only network 150 is described with reference to FIG. 1B. In this example, Server A (152) and Server B (154) are coupled to a LAN (156), and Server 5 (158) is coupled to a LAN (160). Each of the servers includes an STP facility 162, and each facility is coupled to one another via one or more STP links 164.

Further, LAN 156 is coupled to a console 170 and LAN 160 is coupled to a console 172. Console 170 is further coupled to external time source (ETS) 174. In this network, there is no ETR network. Server B has a stratum level of 1, and Servers A and C have a stratum level of 2.

Figure 19:
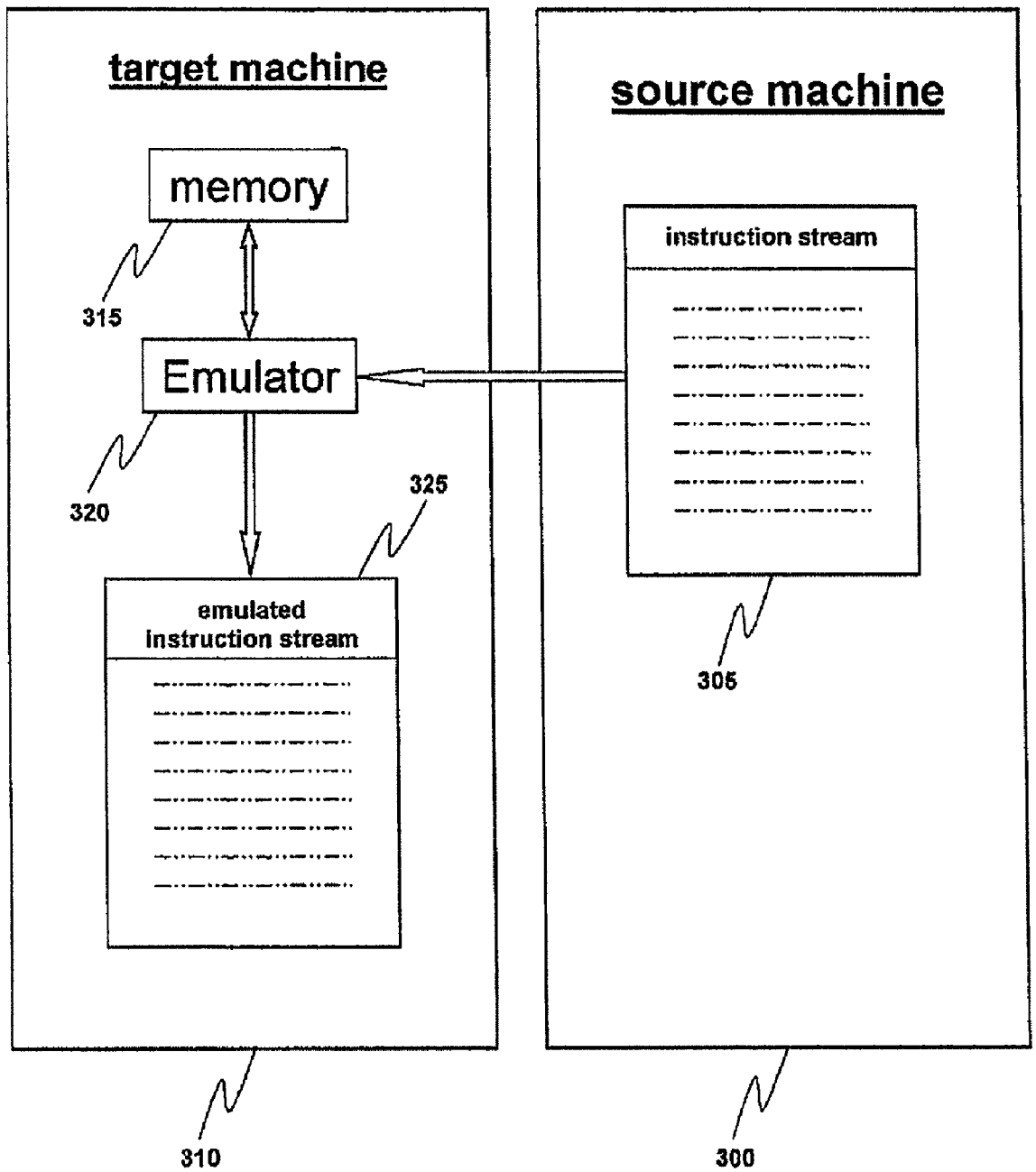
FIG. 19 is a block diagram illustrating an environment in which the instructions of the present invention could be emulated.

It is noted that instructions like the ones described herein are also capable of being emulated. The typical emulation environment in which the present invention could be exploited is illustrated in FIG. 19. Emulators such as 320 except as input instruction streams 305, representing machine or assembly language instructions which are designed to operate on source machine 300. Emulator 320 employees memory 315 in target machine 310 to produce a stream of instructions which are capable of executing on target machine 310. While FIG. 19 particularly shows operation within an emulation environment, it is also noted that the present invention contemplates a situation in which emulator 320 operates essentially as an interpreter in which the instructions are not only translated to the new architecture but in which they are also executed at essentially the same time.

Additional information regarding timing networks is provided in the following patent applications, each of which is hereby incorporated herein by reference n its entirety: U.S. Provisional Ser. No. 60/887,584 entitled "Facilitating Synchronization Of Servers In A Coordinated Timing Network", filed Jan. 31, 2007; U.S. Ser. No. 11/876,152 entitled "Facilitating Synchronization Of Servers In A Coordinated Timing Network", filed Oct. 22, 2007; U.S. Ser. No. 11/876199 entitled "Definition Of A Primary Active Server In A Coordinated Timing Network", filed Oct. 22, 2007; U.S. Provisional Ser. No. 60/887,562 entitled "Defining A Stratum-1 Configuration In A Coordinated Timing Network", filed Jan. 31, 2007; U.S. Ser. No. 11/876,240 entitled "Employing Configuration Information To Determine The Role Of A Server In A Coordinated Timing Network", filed Oct. 22, 2007; U.S. Provisional Ser. No. 60/887,556 entitled "Method And System For Establishing A Logical Path Between Servers In A Coordinated Timing Network", filed Jan. 31, 2007; U.S. Ser. No. 11/876,272 entitled "Establishing A Logical Path Between Servers In A Coordinated Timing Network", filed Oct. 22, 2007; U.S. Provisional Ser. No. 60/887,586 entitled "Facilitating Recovery In A Coordinated Timing Network", filed Jan. 31, 2007; U.S. Ser. No. 11/876,323 entitled "Facilitating Recovery In A Coordinated Timing Network", filed Oct. 22, 2007; U.S. Provisional Ser. No. 60/887,544 entitled "Channel Subsystem Server Time Protocol Commands", filed Jan. 31, 2007; U.S. Provisional Ser. No. 60/887,512 entitled "Server Time Protocol Messages And Methods", filed Jan. 31, 2007; U.S. Ser. No. 11/468,352, entitled "Coordinated Timing Network Configuration Parameter Updated Procedure,"filed Aug. 30, 2006; U.S. Pat. No. 7,395,448 entitled "Directory Obtaining By Application Programs Information Usable In Determining Clock Accuracy", issued Jul. 1, 2008; U.S. Pat. No. 7,356,725 entitled "System And Method For TOD-Clock Steering", issued Apr. 8, 2008; U.S. Ser. No. 11/532,168 entitled "Synchronization Signal For TOD-Clock Steering Adjustment", filed Sep. 15, 2006; U.S. Ser. No. 11/468,501 entitled "Managing Data Access Via A Loop Only If Changed Locking Facility", filed Aug. 30, 2006; U.S. Ser. No. 11/223,878 entitled "Clock Filter Dispersion", filed Sep. 9, 2005; U.S. Ser. No. 11/223,876 entitled "Method And System For Clock Skew And Offset Estimation", filed Sep. 9, 2005; U.S. Pat. No. 7,475,272 entitled "Method For Calculation Clock Offset And Skew", issued Jan. 6, 2009; and U.S. Pat. No. 7,454,648 entitled "System And Method For Calibrating A Time Of Day Clock In A Computing System Node Provided In A Multi Node Network", issued Nov. 18, 2008.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A computer program product for communicating with a timing facility that provides timing coordination for a computer system, said computer program product comprising:

a storage medium readable by a server and storing instructions for execution by the server for performing a method comprising:

fetching a Set STP (Server Time Protocol) Controls machine instruction for accessing a first and a second control block of memory, said first control block of memory being a request block and the second control block of memory being a response block, the machine instruction being defined for computer execution according to a computer architecture, the first control block including:

a command-request-block length field in said first control block, the command-request-block length field for specifying a size for said first control block;

a command code field in said first control block, the command code field for specifying a set STP Controls command;

an STP Operation field in said first control block, said STP Operation field for specifying an operation to be performed by said timing facility, said operation being selected from the group consisting of timing facility synchronization and timing facility control setting, said operation causing a Time of Day (TOD) clock to be synchronized with Coordinated Server Time, in response to the server being in STP-timing mode and a clock-source state indicating that the clock-source state is usable; and a fourth field in said first control block, the fourth field for specifying timing facility parameters for said control setting operation;

executing said machine instruction in accordance with the contents of said fields in said first control block, said executing comprising:

accessing said command code field of said first control block to obtain said command;

accessing said STP Operation field of said first control block to obtain said operation to be performed;

providing said obtained command to said timing facility;

providing said obtained operation to be performed to said timing facility;

responsive to said STP operation to be performed being a Sync Clock operation and responsive to the server being in the STP-timing mode and said clock source state indicating usable clock source state, causing the timing facility to synchronize the Time of Day clock with Coordinated Server Time, placing information regarding the executing of said machine instruction in said second control block, said information comprising information about executing said instruction; and responsive to said operation to be performed being a Set-Controls operation, setting STP controls for the server and the facility to the values provided in the request block.

2. The computer program product of claim 1, in which said second control block includes a first field therein which specifies a size for said second control block and a second field therein which includes a response-code.

3. The computer program product of claim 1, in which said STP operation to be performed is a Sync Clock operation and the server is in the STP-timing mode and said clock source state indicates usable clock source state, and said method further includes setting the timing state for the timing facility and server to the synchronized state and modifying a TOD-clock-change field in the response block to indicate the amount of modification for the TOD clock.

4. The computer program product of claim 3, in which the server is not in the STP-timing mode and a response code of "0109" hexadecimal is provided in a response code field in said second control block which includes a field for containing said response-code and wherein the TOD clock is not modified.

5. The computer program product of claim 3, in which the server does not have a usable clock source and a response code of "0108" hexadecimal is provided in a response code field in said second control block which includes a field for containing said response-code and wherein the TOD clock is not modified.

6. The computer program product of claim 1, in which said command code is found within bytes 2-3 of word 0 of said first control block and in which said command code is designated by the value "0033" hexadecimal.

7. The computer program product of claim 1, in which said STP operation to be performed is a Set-Controls command as specified in an STP Controls field in said first control block.

8. The computer program product of claim 7, in which said STP Controls field in said first control block specifies an option selected from the group consisting of STP-sync-check control, island-condition control, CTN-configuration-change control, STP-clock-source-error control, timing-status-change-alert control, link-availability-change-alert control, time-control-parameter-alert control.

9. The computer program product of claim 8, in which said option comprises one of the following:

said STP-sync-check control which when set to one, enables STP-sync-check machine checks and when set to zero, disables STP-sync-check machine checks;

said island-condition control which when set to one, enables island-condition machine checks and when set to zero, disables island-condition machine checks;

said Cm-configuration-change control which when set to one, enables CTN-configuration-change machine checks and when set to zero, disables CTN-configuration-change machine checks;

said STP-clock-source-error control which when set to one, enables STP-clock-source-error machine checks and when set to zero, disables STP-clock-source-error machine cheeks;

said timing-status-change-alert control which when set to one, enables timing-status-change external interrupts and when set to zero, disables timing-status-change external interrupts;

said link-availability-change-ale control which when set to one, enables link-availability-change external interrupts and when set to zero, disables link-availability change external interrupts; and said time-control-parameter-alert control which when set to one, enables time-control-parameter-alert external interrupts and when set to zero, disables STP-time-control parameter-alert external interrupts.

10. The computer program product of claim 1, in which said second control block is a response block in which is placed results of said execution.

11. The computer program product of claim 1, in which said second control block includes a response field.

12. The computer program product of claim 11, in which said response field includes one of the following:

a response code of "0001" hexadecimal and in which words 4-5 of said second control block contain a signed binary integer indicating the amount that the TOD clock is changed;

a response code "0003" hexadecimal indicating that the length field contains a value other than "0020" hexadecimal, that a reserved field in the request block is not zero, or that the STP operation code field specifies a reserved value;

a response code "0004" hexadecimal indicating that the command is not provided;

a response code "0102" hexadecimal indicating that the command could not be performed because the STP facility is installed but is not enabled;

a response code "0108" hexadecimal indicating that the sync-clock operation is specified and that the CPC does not have a valid clock source;

a response code "0109" hexadecimal indicating that the sync-clock operation is set and the CPC is not in STP-timing mode; and a response code "010A" hexadecimal indicating that the sync-clock operation is specified but that the clock cannot be synchronized because the TOD clock is in the stopped state.

13. A computer system for communicating with a timing facility that provides timing coordination for said computer system, said computer system comprising:

a memory; and a server in communications with the memory, wherein the computer system is capable of performing a method, said method comprising:

fetching a Set STP (Server Time Protocol) Controls machine instruction for accessing a first and a second control block of memory, said first control block of memory being a request block and the second control block of memory being a response block, the machine instruction being defined for computer execution according to a computer architecture, the first control block including:

a command-request-block length field in said first control block, the command-request-block length field for specifying a size for said first control block;

a command code field in said first control block, the command code field for specifying a set STP Controls command;

an STP Operation field in said first control block, said STP Operation field for specifying an operation to be performed by said timing facility, said operation being selected from the group consisting of timing facility synchronization and timing facility control setting, said operation causing a Time of Day (TOD) clock to be synchronized with Coordinated Server Time, in response to the server being in STP-timing mode and a clock-source state indicating that the clock-source state is usable; and a fourth field in said first control block, the fourth field for specifying timing facility parameters for said control setting operation;

executing said machine instruction in accordance with the contents of said fields in said first control block, said executing comprising:

accessing said command code field of said first control block to obtain said command;

accessing said STP Operation field of said first control block to obtain said operation to be performed;

providing said obtained command to said timing facility;

providing said obtained operation to be performed to said timing facility;

responsive to said STP operation to be performed being a Sync Clock operation and responsive to the server being in the STP-timing mode and said clock source state indicating usable clock source state, causing the timing facility to synchronize the Time of Day clock with Coordinated Server Time, placing information regarding the executing of said machine instruction in said second control block, said information comprising information about executing said instruction; and responsive to said operation to be performed being a Set-Controls operation, setting STP controls for the server and the facility to the values provided in the request block.

14. The computer system of claim 13, in which said second control block includes a first field therein which specifies a size for said second control block and a second field therein which includes a response-code.

15. The computer system of claim 13, in which said STP operation to be performed is a Sync Clock operation and the server is in the STP-timing mode and said clock source state indicates usable clock source state, and said method further includes setting the timing state for the timing facility and server to the synchronized state and modifying a TOD-clock-change.

16. The computer system of claim 13, in which said command code is found within bytes 2-3 of word 0 of said first control block and in which said command code is designated by the value "0033" hexadecimal.

17. The computer system of claim 13, in which said STP operation to be performed is a Set-Controls command as specified in an STP Controls field in said first control block.

18. The computer system of claim 17, in which said STP Controls field in said first control block specifies an option selected from the group consisting of STP-sync-check control, island-condition control, CTN-configuration-change control, STP-clock-source-error control, timing-status-change-alert control, link-availability-change-alert control, time-control-parameter-alert control.

19. The computer system of claim 18, in which said option comprises one of the following:

said STP-sync-check control which when set to one, enables STP-sync-check machine checks and when set to zero, disables STP-sync-check machine checks;

said island-condition control which when set to one, enables island-condition machine checks and when set to zero, disables island-condition machine checks;

said CTN-configuration-change control which when set to one, enables CTN-configuration-change machine checks and when set to zero, disables CTN-configuration-change machine checks;

said STP-clock-source-error control which when set to one, enables STP-clock-source-error machine checks and when set to zero, disables STP-clock-source-error machine checks;

said timing-status-change-alert control which when set to one, enables timing-status-change external interrupts and when set to zero, disables timing-status-change external interrupts;

said link-availability-change-alert control which when set to one, enables link-availability-change external interrupts and when set to zero, disables link-availability change external interrupts; and said time-control-parameter-alert control which when set to one, enables time-Control-parameter-alert external interrupts and when set to zero, disables STP-time-control parameter-alert external interrupts.

20. The computer system of claim 13, in which said second control block is a response block in which is placed results of said execution.

21. The computer system of claim 13, in which said second control block includes a response field.

22. The computer system of claim 21, in which said response field includes one of the following:

a response code of "0001" hexadecimal and in which words 4-5 of said second control block contain a signed binary integer indicating the amount that the TOD clock is changed;

a response code "0003" hexadecimal indicating that the length field contains a value other than "0020" hexadecimal, that a reserved field in the request block is not zero, or that the STP operation code field specifies a reserved value;

a response code "0004" hexadecimal indicating that the command is not provided;

a response code "0102" hexadecimal indicating that the command could not be performed because the STP facility is installed but is not enabled;

a response code "0108" hexadecimal indicating that the sync-clock operation is specified and that the CPC does not have a valid clock source;

a response code "0109" hexadecimal indicating that the sync-clock operation is set and the CPC is not in STP-timing mode; and a response code "010A" hexadecimal indicating that the sync-clock operation is specified but that the clock cannot be synchronized because the TOD clock is in the stopped state.

23. A method for communicating with a timing facility that provides timing coordination for a server coupled to the timing facility, said method comprising:

fetching a Set STP (Server Time Protocol) Controls machine instruction for accessing a first and a second control block of memory, said first control block of memory being a request block and the second control block of memory being a response block, the machine instruction being defined for computer execution according to a computer architecture, the first control block including:

a command-request-block length field in said first control block, the command-request-block length field for specifying a size for said first control block;

a command code field in said first control block, the command code field for specifying a set STP Controls command;

an STP Operation field in said first control block, said STP Operation field for specifying an operation to be performed by said timing facility, said operation being selected from the group consisting of timing facility synchronization and timing facility control setting, said operation causing a Time of Day (TOD) clock to be synchronized with Coordinated Server Time, in response to the server being in STP-timing mode and a clock-source state indicating that the clock-source state is usable; and a fourth field in said first control block, the fourth field for specifying timing facility parameters for said control setting operation;

executing said machine instruction in accordance with the contents of said fields in said first control block, said executing comprising:

accessing said command code field of said first control block to obtain said command;

accessing said STP Operation field of said first control block to obtain said operation to be performed;

providing said obtained command to said timing facility;

providing said obtained operation to be performed to said timing facility;

responsive to said STP operation to be performed being a Sync Clock operation and responsive to the server being in the STP-timing mode and said clock source state indicating usable clock source state, causing the timing facility to synchronize the Time of Day clock with Coordinated Server Time placing information regarding the executing of said machine instruction in said second control block, said information comprising information about executing said instruction; and responsive to said operation to be performed being a Set-Controls operation, setting STP controls for the server and the facility to the values provided in the request block.

24. The method of claim 23, in which said second control block includes a first field therein which specifies a size for said second control block and a second field therein which includes a response-code.

25. The method of claim 23, in which said STP operation to be performed is a Sync Clock operation and the server is in the STP-timing mode and said clock source state indicates usable clock source state, further including setting the timing state for the timing facility and server to the synchronized state and modifying a TOD-clock-change field in the response block to indicate the amount of modification for the TOD clock.

26. The method of claim 23, in which said STP operation to be performed is a Set-Controls command as specified in an STP Controls field in said first control block.

27. The method of claim 26, in which said STP Controls field in said first control block specifies an option selected from the group consisting of STP-sync-check control, island-condition control, CTN-configuration-change control, STP-clock-source-error control, timing-status-change-alert control, link-availability-change-alert control, time-control-parameter-alert control.

28. The method of claim 23, in which said second control block includes a response field, in which said response field includes one of the following:

a response code of "0001" hexadecimal and in which words 4-5 of said control block contain a signed binary integer indicating the amount that the TOD clock is charged;

a response code "0003" hexadecimal indicating that the length field contains a value other than "0020" hexadecimal, that a reserved field in the request block is not zero, or that the STP operation code field specifies a reserved value;

a response code "0004" hexadecimal indicating that the command is not provided;

a response code "0102" hexadecimal indicating that the command could not be performed because the STP facility is installed but is not enabled;

a response code "0108" hexadecimal indicating that the sync-clock operation is specified and that the CPC does not have a valid clock source;

a response code "0109" hexadecimal indicating that the sync-clock operation is set and the CPC is not in STP-timing mode; and a response code "010A" hexadecimal indicating that the sync-clock operation is specified but that the clock cannot be synchronized because the TOD clock is in the stopped state.

* * * * *